(12) United States Patent
Atallah et al.

(10) Patent No.: US 12,067,358 B1
(45) Date of Patent: Aug. 20, 2024

(54) USING A NATURAL LANGUAGE INTERFACE TO EXPLORE ENTITY RELATIONSHIPS FOR SELECTED DATA SOURCES

(71) Applicant: Tableau Software, LLC, Seattle, WA (US)

(72) Inventors: Ryan Andrew Atallah, Palo Alto, CA (US); Clark Wildenradt, Seattle, WA (US); Lu Han, San Mateo, CA (US)

(73) Assignee: Tableau Software, LLC, Seattle, WA (US)

( * ) Notice: Subject to any disclaimer, the term of this patent is extended or adjusted under 35 U.S.C. 154(b) by 0 days.

(21) Appl. No.: 17/368,783

(22) Filed: Jul. 6, 2021

(51) Int. Cl.
| | |
|---|---|
| *G06F 40/177* | (2020.01) |
| *G06F 3/0482* | (2013.01) |
| *G06F 3/0484* | (2022.01) |
| *G06F 9/451* | (2018.01) |
| *G06F 16/22* | (2019.01) |
| *G06F 16/26* | (2019.01) |
| *G06F 40/205* | (2020.01) |

(52) U.S. Cl.
CPC .......... *G06F 40/177* (2020.01); *G06F 3/0482* (2013.01); *G06F 3/0484* (2013.01); *G06F 9/451* (2018.02); *G06F 16/2282* (2019.01); *G06F 16/26* (2019.01); *G06F 40/205* (2020.01)

(58) Field of Classification Search
None
See application file for complete search history.

(56) References Cited

U.S. PATENT DOCUMENTS

| | | | |
|---|---|---|---|
| 7,703,021 B1 * | 4/2010 | Flam | G06F 21/6227 715/741 |
| 8,099,674 B2 | 1/2012 | Mackinlay et al. | |
| 8,375,014 B1 * | 2/2013 | Brocato | G06F 16/213 707/705 |
| 10,515,121 B1 * | 12/2019 | Setlur | G10L 15/1815 |

(Continued)

OTHER PUBLICATIONS

F. Siasar djahantighi, M. Norouzifard, S. H. Davarpanah and M. H. Shenassa, (non-patent Literature, "Using natural language processing in order to create SQL queries," 2008 International Conference on Computer and Communication Engineering, 2008, pp . 600-604, doi: 10.1109/ICCCE.2008.4580674) (Year: 2008).*

(Continued)

*Primary Examiner* — William L Bashore
*Assistant Examiner* — Gabriel Mercado
(74) *Attorney, Agent, or Firm* — Morgan, Lewis & Bockius LLP

(57) ABSTRACT

A method is performed at a computing device having a display, processors, and memory. A user inputs a natural language expression, directed to a selected data source, in a first region of a graphical user interface. The device parses the natural language expression and determines that the natural language expression specifies a data table from the data source either (i) directly by identifying the data table specified in the natural language expression or (ii) indirectly by identifying a data value specified in the natural language expression. The data value is a data value of a data field within the data table. In response, the device generates and displays, in the graphical user interface, a count of data rows of the data table, and a rendering of data rows and data columns of the data table.

19 Claims, 23 Drawing Sheets

(56) References Cited

U.S. PATENT DOCUMENTS

| | | | |
|---|---|---|---|
| 10,546,001 | B1 | 1/2020 | Nguyen et al. |
| 10,558,688 | B1* | 2/2020 | Nguyen ................ G06F 16/243 |
| 10,949,444 | B2 | 3/2021 | Keahey et al. |
| 11,604,794 | B1 | 3/2023 | Nallapati et al. |
| 2005/0080770 | A1* | 4/2005 | Lueder ................. G06F 3/0481 |
| 2006/0069605 | A1 | 3/2006 | Hatoun |
| 2009/0313576 | A1* | 12/2009 | Neumann ............. G06T 11/206 715/783 |
| 2010/0312602 | A1 | 12/2010 | McLoughlin et al. |
| 2011/0173680 | A1 | 7/2011 | Bates et al. |
| 2014/0040871 | A1 | 2/2014 | Schwan et al. |
| 2014/0229497 | A1 | 8/2014 | Wolfram et al. |
| 2014/0244625 | A1* | 8/2014 | Seghezzi ............... G06F 16/248 707/722 |
| 2014/0317155 | A1 | 10/2014 | Treibach-Heck et al. |
| 2015/0100588 | A1 | 4/2015 | Allen et al. |
| 2016/0232537 | A1 | 8/2016 | Nonez et al. |
| 2016/0283091 | A1* | 9/2016 | Hang ..................... G06Q 50/14 |
| 2017/0308571 | A1 | 10/2017 | McCurley et al. |
| 2018/0329948 | A1 | 11/2018 | Nijor et al. |
| 2019/0179495 | A1* | 6/2019 | Watanabe ............. G06F 3/0481 |
| 2019/0362009 | A1* | 11/2019 | Miseldine ........... G06F 16/9038 |
| 2020/0012638 | A1* | 1/2020 | Luo ...................... G06F 16/243 |
| 2020/0089700 | A1* | 3/2020 | Ericson ................ G06F 40/166 |
| 2020/0089760 | A1* | 3/2020 | Ericson ............... G06F 3/04812 |
| 2020/0097302 | A1 | 3/2020 | Deutch |
| 2020/0104401 | A1* | 4/2020 | Burnett ............... G06F 16/2477 |
| 2020/0110779 | A1* | 4/2020 | Setlur ............... G06F 16/24522 |
| 2020/0110803 | A1* | 4/2020 | Djalali ................. G06F 16/248 |
| 2020/0134103 | A1 | 4/2020 | Mankovskii |
| 2020/0134641 | A1 | 4/2020 | Morgan et al. |
| 2020/0134683 | A1 | 4/2020 | Boren et al. |
| 2020/0174755 | A1 | 6/2020 | Rose et al. |
| 2020/0236013 | A1 | 7/2020 | Mocanu et al. |
| 2020/0293167 | A1* | 9/2020 | Blyumen .......... G06F 16/90332 |
| 2020/0334238 | A1 | 10/2020 | Sherman et al. |
| 2020/0380432 | A1 | 12/2020 | Wang et al. |
| 2021/0117056 | A1 | 4/2021 | Kuo et al. |
| 2021/0182283 | A1* | 6/2021 | Carney ................ G06F 16/248 |
| 2021/0224328 | A1 | 7/2021 | Schrupp et al. |
| 2021/0225529 | A1 | 7/2021 | Viengkham et al. |
| 2021/0232920 | A1 | 7/2021 | Parangi et al. |
| 2021/0342125 | A1 | 11/2021 | Burnett et al. |
| 2021/0342785 | A1 | 11/2021 | Mann et al. |
| 2021/0349581 | A1 | 11/2021 | Egozi et al. |
| 2021/0406325 | A1 | 12/2021 | Sinn et al. |
| 2022/0050695 | A1 | 2/2022 | Gajendran et al. |
| 2022/0358286 | A1 | 11/2022 | Wilson-Thomas et al. |
| 2022/0405314 | A1 | 12/2022 | Du et al. |
| 2023/0109718 | A1 | 4/2023 | Polen et al. |

OTHER PUBLICATIONS

D. Song et al., (non-patent Literature, "Building and Querying an Enterprise Knowledge Graph," in IEEE Transactions on Services Computing, vol. 12, No. 3, pp. 356-369, May 1-Jun. 2019, doi: 10.1109/TSC.2017.2711600.) (Year: 2019).*

Atallah, Office Action, U.S. Appl. No. 17/357,912, Feb. 1, 2022, 25 pgs.

Atallah, Notice of Allowance, U.S. Appl. No. 17/357,912, Jul. 8, 2022, 12 pgs.

Mannheimer, Office Action, U.S. Appl. No. 17/521,820, Jan. 13, 2023, 18 pgs.

Atallah, Office Action, U.S. Appl. No. 17/473,992, Jun. 14, 2023, 42 pgs.

Gao, Tong, et al. "Datatone: Managing ambiguity in natural language interfaces for data visualization." Proceedings of the 28th annual acm symposium on user interface software & technology. 2015, pp. 489-500. (Year: 2015).

Giannakopoulou, Dimitra, et al. "Automated formalization of structured natural language requirements." Information and Software Technology 137 (Apr. 21, 2021) 106590, pp. 1-19 (Year: 2021).

Mavin, Alistair, et al. "Easy approach to requirements syntax (EARS)." 2009 17th IEEE International Requirements Engineering Conference. IEEE, 2009, pp. 317-322 (Year: 2009).

Mazo, Rall, et al. "Towards a new template for the specification of requirements in semi-structured natural language." Journal of Software Engineering Research and Development 8 (2020), pp. 1-16 (Year: 2020).

Narechania, Arpit, et al. "N L4DV: A toolkit for generating analytic specifications for data visualization from natural language queries." IEEE Transactions on Visualization and Computer Graphics 27.2 (2020), pp. 369-379 (Year: 2020).

Setlur, Vidya, et al. "Eviza: A natural language interface for visual analysis." Proceedings of the 29th annual symposium on user interface software and technology. 2016, p. 365-377. (Year: 2016).

Mannheimer, Final Office Action, U.S. Appl. No. 17/521,820, May 8, 2023, 21 pgs.

Miller, Office Action, U.S. Appl. No. 17/878,821, Aug. 24, 2023, 17 pgs.

Atallah, Final Office Action, U.S. Appl. No. 17/473,992, Nov. 2, 2023, 51 pgs.

Atallah, Office Action, U.S. Appl. No. 17/474,018, Jan. 3, 2024, 17 pgs.

Dashevsky, "23 Cool Non-Math Things You Can Do With Wolfram Alpha", https://www.pcmag.com/news/23-cool-non-math-things-you-can-do-with-wolfram-alpha, May 16, 2016. (Year: 2016).

Miller, Final Office Action, U.S. Appl. No. 17/878,821, Dec. 15, 2023, 21 pgs.

* cited by examiner

| ID | Profit | Customer Name | Country/Region | Sales | City | State | Ship Mode | Orde |
|---|---|---|---|---|---|---|---|---|
| 1 | 25.19 | William Brown | United States | 119.96 | Anaheim | California | Same Day | |
| 2 | 145.78 | Sandra Glassco | United States | 1295.84 | Redlands | California | Same Day | |
| 3 | 329.99 | Dan Reichenbach | United States | 879.98 | Inglewood | California | Second Class | |
| 4 | 9.00 | Rick Wilson | United States | 71.98 | Brentwood | California | Standard Class | |
| 5 | 19.20 | Anthony Johnson | United States | 191.98 | San francisco | California | Standard Class | |
| 6 | 37.80 | Patrick Ryan | United States | 431.97 | Oakland | California | First Class | |
| 7 | 53.27 | Dave Hallsten | United States | 532.72 | Fairfield | California | First Class | |
| 8 | 287.98 | Anthony Johnson | United States | 767.95 | San Francisco | California | Standard Class | |
| 9 | 2.70 | Greg Guthrie | United States | 7.99 | Chico | California | Standard Class | |
| 10 | 16.70 | Jamie Kuritz | United States | 148.48 | San francisco | California | Standard Class | |

| ID | Profit | Customer Name | Country/Region | Sales | City | State | Ship Mode |
|---|---|---|---|---|---|---|---|
| 1 | 0.50 | Khloe Miller | United States | 1.78 | Roswell | Georgia | Standard Class |
| 2 | 0.71 | Cassandra Brandow | United States | 7.12 | Waco | Texas | Second Class |
| 3 | 0.87 | Christopher Schild | United States | 2.48 | Fargo | North Dakota | Standard Class |
| 4 | 1.20 | Mark Hamilton | United States | 19.15 | Chicago | Illinois | Same Day |
| 5 | 1.80 | Jennifer Halladay | United States | 28.73 | Burlington | North Carolina | First Class |
| 6 | 2.60 | Richard Bierner | United States | 7.44 | Los Angeles | California | Standard Class |
| 7 | 2.96 | Christine Kargatis | United States | 7.58 | Seattle | Washington | Standard Class |
| 8 | 4.49 | Christina VanderZanden | United States | 16.02 | Fresno | California | First Class |
| 9 | 4.79 | Filia McAdams | United States | 14.52 | Los Angeles | California | Standard Class |
| 10 | 4.85 | Ann Steele | United States | 15.53 | Boynton Beach | Florida | Standard Class |

Figure 11A

1310 Determine that the first natural language input specifies a data table from the data source.

1316 Generate and display, in the graphical user interface, a count of data rows of the data table and a rendering of data rows and data columns of the data table.

(A)

1322 The first natural language input identifies a first data value of a first data field in the data table. In response, i) filter the data rows of the data table to a first subset of data rows whose data value for the first data field match the first data value, (ii) display a first count of the first subset of data rows, and (iii) display a rendering of the first subset of data rows.

1324 Generate and display, in a second region of the graphical user interface, a first entity profile corresponding to the first data value. The first entity profile identifies one or more of: the first data field, a parent field of the first data field, one or more sibling values of the first data field, and/or one or more child values related to the first data value.

1326 The first entity profile includes a count of rows of the data table that have a valid value for the first data field and/or a count of rows of the data table whose value of the first data field matches the first data value.

1328 Receive user selection of a first sibling value of the sibling values in the first entity profile. In response to the user selection of the first sibling value: modify the first natural language input by replacing the first data value with the first sibling value in the first region, and generate and display on the graphical user interface: an updated count of data rows of the data table whose value of the first data field matches the first sibling value, and an updated rendering of the data table consisting of rows whose data value for the first data field match the first sibling value.

1330 Generate a second entity profile corresponding to the first sibling value. The second entity profile identifies one or more of: the first data field, the parent field, other data values of the first data field, and/or one or more child values related to the first sibling value. Replace display of the first entity profile with the second entity profile in the second region.

1310 Determine that the first natural language input specifies a data table from the data source.

1316 Generate and display, in the graphical user interface, a count of data rows of the data table and a rendering of data rows and data columns of the data table.

1322 The first natural language input identifies a first data value of a first data field in the data table. In response, i) filter the data rows of the data table to a first subset of data rows whose data value for the first data field match the first data value, (ii) display a first count of the first subset of data rows, and (iii) display a rendering of the first subset of data rows.

1324 Generate and display, in a second region of the graphical user interface, a first entity profile corresponding to the first data value. The first entity profile identifies one or more of: the first data field, a parent field of the first data field, one or more sibling values of the first data field, and/or one or more child values related to the first data value.

(B)

1332 Receive user selection of a first child value of the child values in the first entity profile. In response to the user selection of the first child value: modify the first natural language input by appending the first child value to the first natural language input in the first region and generating and displaying on the graphical user interface: a third count of data rows of the data table based on further filtering the data rows of the data table from the first subset to a third subset of data rows whose child value of the first data value matches the first child value, and a rendering of the third subset of data rows.

1334 Within the rendering of the first subset of data rows, receive user selection of a second data value of a second data field in the data table. In response to the user selection, append the second data value to the first natural language input in the first region of the graphical user interface, further filter the data rows of the data table from the first subset of data rows to a second subset of data rows whose data value for the second data field match the second data value, and update the display from the first count to a second count of the second subset of data rows.

1310 Determine that the first natural language input specifies a data table from the data source.

1316 Generate and display, in the graphical user interface, a count of data rows of the data table and a rendering of data rows and data columns of the data table.

1334 Within the rendering of the first subset of data rows, receive user selection of a second data value of a second data field in the data table. In response to the user selection, append the second data value to the first natural language input in the first region of the graphical user interface, further filter the data rows of the data table from the first subset of data rows to a second subset of data rows whose data value for the second data field match the second data value, and update the display from the first count to a second count of the second subset of data rows.

( C )

1336 Detect user interaction with the second count. In response to detecting the user interaction, display a pop-up data widget that (i) identifies one or more data values according to which the second subset of data rows has been filtered and (ii) identifies, for each of the one or more data values, a respective data field to which the respective data value belongs. The one or more data values include the second data value.

1338 The first natural language input identifies the data table. Within the rendering of the first subset of data rows, receive user selection of a third data value of a third data field in the data table. In response to the user selection, append the third data value to the first natural language input in the first region of the graphical user interface, filter the data rows of the data table to a fourth subset of data rows whose data value for the third data field match the third data value, and update the count to a fourth count of the third subset of data rows.

1340 Receive user input in the first region specifying removal of the one or more additional terms. In response to the user input, generate and display, on the graphical user interface, the count of data rows of the data table and the rendering of data rows and data columns of the data table.

1310 Determine that the first natural language input specifies a data table from the data source.

1316 Generate and display, in the graphical user interface, a count of data rows of the data table and a rendering of data rows and data columns of the data table.

1342 Receive, in the first region, user input of one or more additional terms that are appended to the first natural language input. In response to receiving the one or more additional terms, parse the first natural language input and the additional terms. When one or more additional terms contain an analytical term specifying aggregation, group, limit, or filter: generate a first data visualization having a first data visualization type according to the first natural language input and the analytical term, and replace display of the count and the rendering in the graphical user interface with the first data visualization.

Figure 13E

USING A NATURAL LANGUAGE INTERFACE TO EXPLORE ENTITY RELATIONSHIPS FOR SELECTED DATA SOURCES

RELATED APPLICATIONS

This application is related to the following applications, each of which is incorporated by reference herein in its entirety:
(i) U.S. patent application Ser. No. 15/486,265, filed Apr. 12, 2017, entitled "Systems and Methods of Using Natural Language Processing for Visual Analysis of a Data Set," now U.S. Pat. No. 10,515,121;
(ii) U.S. patent application Ser. No. 15/804,991, filed Nov. 6, 2017, entitled "Systems and Methods of Using Natural Language Processing for Visual Analysis of a Data Set";
(iii) U.S. patent application Ser. No. 15/978,062, filed May 11, 2018, entitled "Applying Natural Language Pragmatics in a Data Visualization User Interface";
(iv) U.S. patent application Ser. No. 15/978,066, filed May 11, 2018, entitled "Data Visualization User Interface Using Cohesion of Sequential Natural Language Commands";
(v) U.S. patent application Ser. No. 15/978,067, filed May 11, 2018, entitled "Updating Displayed Data Visualizations According to Identified Conversation Centers in Natural Language Commands";
(vi) U.S. patent application Ser. No. 16/219,406, filed Dec. 13, 2018, entitled "Identifying Intent in Visual Analytical Conversations";
(vii) U.S. patent application Ser. No. 16/134,892, filed Sep. 18, 2018, entitled "Analyzing Natural Language Expressions in a Data Visualization User Interface";
(viii) U.S. patent application Ser. No. 16/134,907, filed Sep. 18, 2018, entitled "Natural Language Interface for Building Data Visualizations, Including Cascading Edits to Filter Expressions";
(ix) U.S. patent application Ser. No. 16/166,125, filed Oct. 21, 2018, entitled "Determining Levels of Detail for Data Visualizations Using Natural Language Constructs";
(x) U.S. patent application Ser. No. 16/234,470, filed Dec. 27, 2018, entitled "Analyzing Underspecified Natural Language Utterances in a Data Visualization User Interface";
(xi) U.S. patent application Ser. No. 16/601,437, filed Oct. 14, 2019, entitled "Incremental Updates to Natural Language Expressions in a Data Visualization User Interface";
(xii) U.S. patent application Ser. No. 16/680,431, filed Nov. 11, 2019, entitled "Using Refinement Widgets for Data Fields Referenced by Natural Language Expressions in a Data Visualization User Interface";
(xiii) U.S. patent application Ser. No. 14/801,750, filed Jul. 16, 2015, entitled "Systems and Methods for using Multiple Aggregation Levels in a Single Data Visualization"; and
(xiv) U.S. patent application Ser. No. 16/681,754, filed Nov. 12, 2019, entitled "Using Natural Language Expressions to Define Data Visualization Calculations that Span Across Multiple Rows of Data from a Database."

TECHNICAL FIELD

The disclosed implementations relate generally to data visualization and more specifically to systems, methods, and user interfaces that enable users to interact with data visualizations and explore data for selected data sources.

BACKGROUND

Data visualization applications enable a user to understand a data set visually. Visual analyses of data sets, including distribution, trends, outliers, and other factors are important to making business decisions. Some data sets are very large or complex and include many data fields. Various tools can be used to help understand and analyze the data, including dashboards that have multiple data visualizations and natural language interfaces that help with visual analytical tasks.

SUMMARY

The use of natural language expressions to generate data visualizations provides a user with greater accessibility to data visualization features, including updating the fields and changing how the data is filtered. A natural language interface enables a user to develop valuable data visualizations with little or no training.

There is a need for improved systems and methods that support and refine natural language interactions with visual analytical systems. The present disclosure describes data visualization platforms that improve the effectiveness of natural language interfaces by resolving natural language utterances as they are being input by a user of the data visualization platform. Unlike existing interfaces, which require natural language inputs to be composed of complete words and/or phrases, the present disclosure describes a natural language interface that provides feedback (e.g., generates interpretations, search results, or entity search results) in response to each subsequent additional keystroke that is input by the user.

The disclosed natural language interface also resolves ambiguities in natural language utterances by allowing a user to annotate a term in a natural language command. Annotation instructs the data visualization platform to interpret the term as a particular entity in the data source. Accordingly, by giving the user control over how a term should be disambiguated, the disclosed data visualization platforms enables more accurate visualizations to be generated. Such methods and interfaces reduce the cognitive burden on a user and produce a more efficient human-machine interface. For battery-operated devices, such methods and interfaces conserve power and increase the time between battery charges. Such methods and interfaces may complement or replace conventional methods for visualizing data. Other implementations and advantages will be apparent to those skilled in the art in light of the descriptions and drawings in this disclosure.

In accordance with some implementations, a method of generating a dashboard for data analysis using a natural language interface is performed at a computing device. The computing device has a display, one or more processors, and memory. The memory stores one or more programs configured for execution by the one or more processors. The computing device receives, in a first region of a graphical user interface, a first natural language input directed to a selected data source. In response to receiving the first natural language input, the computing device parses the first natural language input. The computing device determines whether the first natural language input specifies a data table from the data source either (i) directly, by identifying the data table specified in the first natural language input, or (ii) indirectly, by identifying a first data value specified in the first natural language input. The first data value is a data value of a first data field within the data table. The computing device then generates and displays a count of data rows of the data table and a rendering of data rows and data columns of the data table in the graphical user interface.

In some implementations, the computing device displays, adjacent to the displayed count, an identification of the data table and/or a description of an analytical operation that is performed on a data field within the data table to obtain the count.

In some implementations, the generation and display of the count includes generating and displaying the count as a text table.

In some implementations, the first natural language input identifies a first data value of a first data field. In some implementations, the generation and display in the graphical user interface includes filtering the data rows of the data table to a first subset of fata rows whose data value for the first data field match the first data value. In some implementations, the generation and display also include displaying a first count of the first subset of data rows. In some implementations, the generation and display further include displaying a rendering of the first subset of data rows.

In some implementations, within the rendering of the first subset of data rows, the computing device receives user selection of a second data value of a second data field in the data table. In response to the user selection, the computing device appends the second data value, automatically and without user intervention, to the first natural language input in the first region of the graphical user interface. In some implementations, the computing device further filters the data rows of the data table from the first subset of data rows to a second subset of data rows whose data value for the second data field match the second data value. In some implementations, the computing device updates the display from the first count to a second count of the second subset of data rows.

In some implementations, the computing device detects a user interaction with the second count. In some implementations, in response to detecting the user interaction, the computing device displays a pop-up data widget. The pop-up data widget identifies one or more data values according to which the second subset of data rows has been filtered. In some implementations, the pop-up data widget also identifies, for each of the one or more data values, a respective data field to which the respective data value belongs. In some implementations, the one or more data values include the second data value.

In some implementations, the computing device generates and displays, in a second region of the graphical user interface, a first entity profile. The first entity profile corresponds to the first data value. In some implementations, the first entity profile includes a first data field. In some implementations, the first entity profile includes a parent field of the first data field. In some implementations, the first entity profile includes one or more sibling values of the first data field. In some implementations, the first entity profile includes one or more child values related to the first data value.

In some implementations, the first entity profile includes a count of rows of the data table that have a valid value for the first data field. Additionally, or alternatively, the first entity profile includes a count of rows of the data table whose value of the first data field matches the first data value.

In some implementations, the computing device receives user selection of a first sibling value of the sibling values in the first entity profile. In some implementations, in response to the user selection of the first sibling value, the computing device modifies the first natural language input by replacing the first data value with the first sibling value in the first region. In some implementations, the computing device generates and displays, in the graphical user interface, an updated count of data rows of the data table whose value of the first data field matches the first sibling value. Additionally, the computing device generates and displays, in the graphical user interface, an updated rendering of the data table consisting of rows whose data value for the first data field match the first sibling value.

In some implementations, the computing device generates a second entity profile corresponding to the first sibling value. In some implementations, the second entity profile includes identification of one or more of: the first data field, the parent field, other data values of the first data field, and one or more child values related to the first sibling value. In some implementations, the computing device replaces the display of the first entity profile with the second entity profile in the second region.

In some implementations, the computing device receives user selection of a first child value of the child values in the first entity profile. In some implementations, in response to the user selection of the first child value, the computing device modifies the first natural language input by appending the first child value to the first natural language input in the first region. In some implementations, the computing device generates and displays, in the graphical user interface, a third count of data rows of the data table. The third count of data rows is based on further filtering the data rows of the data table from the first subset to a third subset of data rows whose child value of the first data value matches the first child value. In some implementations, the computing device generates and displays a rendering of the third subset of data rows.

In some implementations, the first natural language input directly identifies the data table. In some implementations, within the rendering of the first subset of data rows, the computing device receives user selection of a third data value of a third data field in the data table. In response to the user selection, the computing device appends the third data value (automatically and without user intervention) to the first natural language input in the first region of the graphical user interface. Additionally, in response to the user selection, the computing device filters the data rows of the data table to a fourth subset of data rows whose data value for the third data field match the third data value. Additionally, in response to the user selection, the computing device updates the count to a fourth count of the third subset of data rows.

In some implementations, the computing device receives, in the first region, user input of one or more additional terms that are appended to the first natural language input. In some implementations, in response to receiving the one or more additional terms, the computing device parses the first natural language input and the additional terms. In some implementations, the computing device determines that the one or more additional terms contain an analytical term specifying aggregation, grouping, limiting, or filtering. In response to the determination, the computing device generates a first data visualization having a first data visualization type according to the first natural language input and the analytical term. Additionally, in response to the determination, the computing device replaces the display of the count and the rendering in the graphical user interface with the first data visualization.

In some implementations, the computing device receives user input in the first region, thereby specifying removal of the one or more additional terms. In some implementations, in response to the user input, the computing device generates and displays, in the graphical user interface, the count of data rows of the data table and the rendering of data rows and data columns of the data table.

In some implementations, the first natural language input is a single word.

In some implementations, a computing device has one or more processors, memory, and a display. The memory stores one or more programs configured for execution by the one or more processors. The one or more programs include instructions for performing any of the methods described herein.

In some implementations, a non-transitory computer-readable storage medium stores one or more programs configured for execution by a computing device having one or more processors and memory. The one or more programs include instructions for performing any of the methods described herein.

Thus methods, systems, and graphical user interfaces are disclosed that enable users to easily interact with data visualizations and analyze data using natural language expressions.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIGS. 8A-8B provide a series of screen shots for interactions with a graphical user interface according to some implementations.

FIG. 9 provides a screen shot for an interaction with a graphical user interface according to some implementations.

FIG. 10 provides a screen shot for an interaction with a graphical user interface according to some implementations.

FIGS. 11A and 11B provide a series of screen shots for interactions with a graphical user interface according to some implementations.

FIGS. 13A-13E provide a flow chart of the systems and methods for generating a dashboard according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Some methods and devices disclosed in the present specification improve upon data visualization methods by generating and displaying interpretations in response to each subsequent additional keystroke of a partial natural language command (e.g., a command that contains incomplete words, phrases, and/or sentences), and by allowing a user to annotate a term in the natural language command, which in turn instructs a data visualization application to interpret the term as a particular entity in the data source. Such methods and devices improve user interaction with the natural language interface by providing quicker and easier incremental updates to natural language expressions related to a data visualization.

Figure 1:
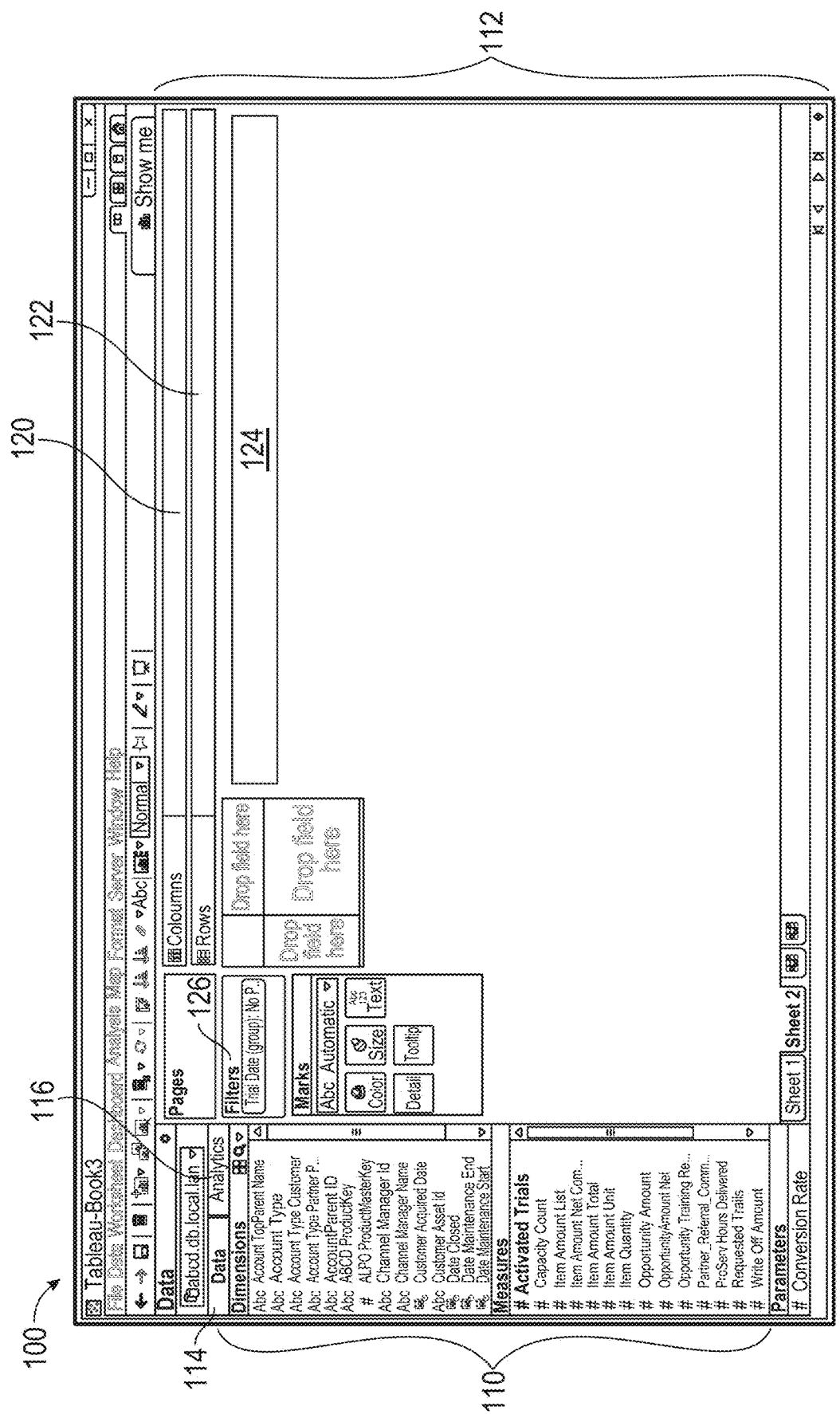
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets. In some implementations, the data visualization region 112 includes a region 126 for data visualization filters.

In some implementations, the graphical user interface 100 also includes a natural language input box 124 (also referred to as a command box) for receiving natural language commands. A user may interact with the command box to provide commands. For example, the user may provide a natural language command by typing in the box 124. In addition, the user may indirectly interact with the command box by speaking into a microphone 220 to provide commands. In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language input box 124) to further explore the displayed data visualization. In some instances, a user creates the initial association using the natural language input box 124, which results in one or more data elements being placed on the column shelf 120 and on the row shelf 122. For example, the user may provide a command to create a relationship between a data element X and a data element Y. In response to receiving the command, the column shelf 120 and the row shelf 122 may be populated with the data elements (e.g., the column shelf 120 may be populated with the data element X and the row shelf 122 may be populated with the data element Y, or vice versa).

Figure 2A:
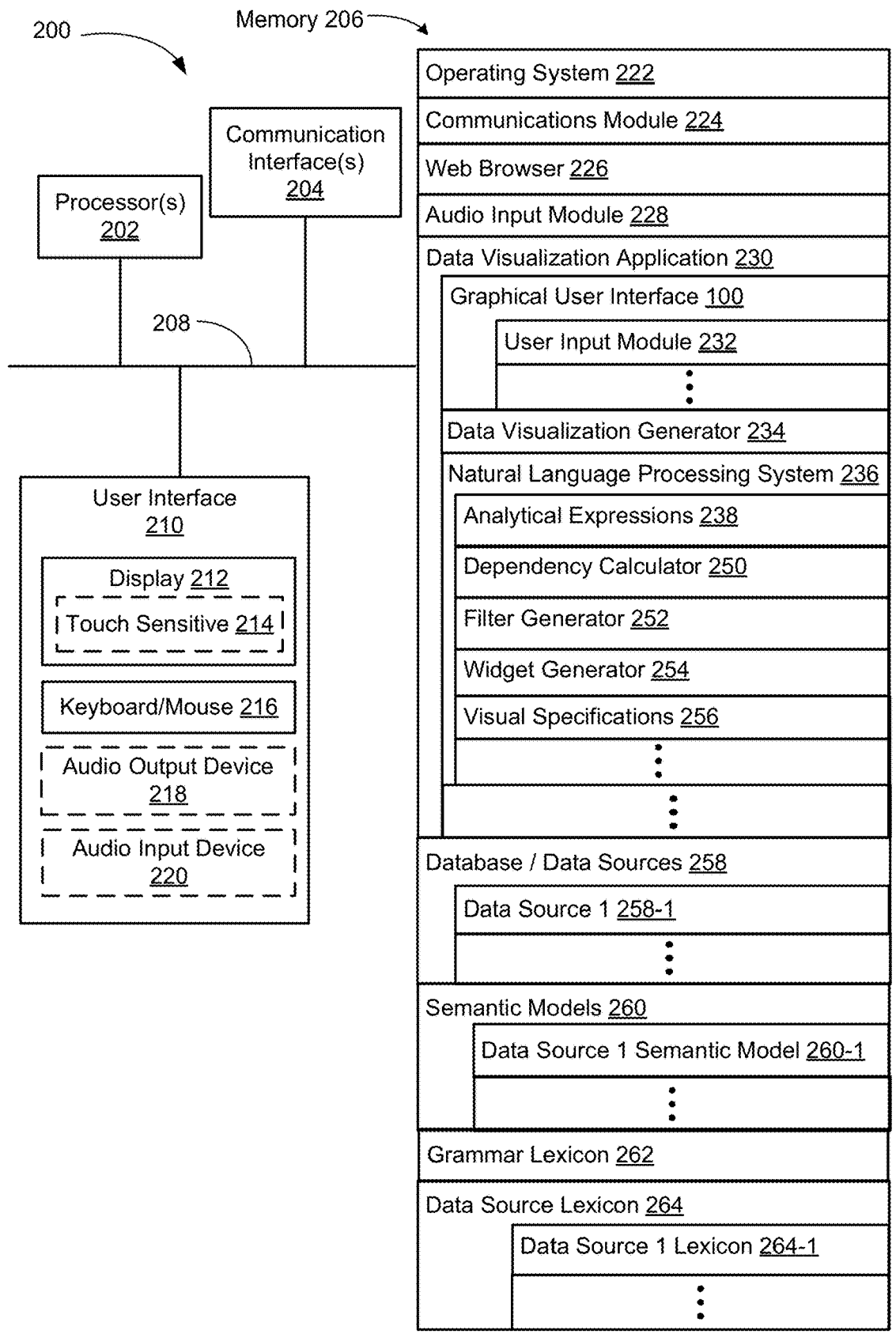
FIGS. 2A-2D are block diagrams of a computing device according to some implementations.

FIG. 2A is a block diagram illustrating a computing device 200 that can display the graphical user interface 100 in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communication interfaces 204, memory 206, and one or more communication buses 208 for interconnecting these components. In some implementations, the communication buses 208 include circuitry (sometimes called a chipset) that interconnects and controls communications between system components.

The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone 220 and voice recognition to supplement or replace the keyboard. In some implementations, the computing device 200 includes an audio input device 220 (e.g., a microphone) to capture audio (e.g., speech from a user).

In some implementations, the memory 206 includes high-speed random-access memory, such as DRAM, SRAM, DDR RAM, or other random-access solid-state memory devices. In some implementations, the memory 206 includes non-volatile memory, such as one or more magnetic disk storage devices, optical disk storage devices, flash memory devices, or other non-volatile solid-state storage devices. In some implementations, the memory 206 includes one or more storage devices remotely located from the processors 202. The memory 206, or alternatively the non-volatile memory devices within the memory 206, includes a non-transitory computer-readable storage medium. In some implementations, the memory 206, or the computer-readable storage medium of the memory 206, stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module) for processing audio captured by the audio input device 220. The captured audio may be sent to a remote server and/or processed by an application executing on the computing device 200 (e.g., the data visualization application 230 or the natural language system 236);
- a data visualization application 230, which generates data visualizations and related features. In some implementations, the data visualization application 230 includes:
  - a graphical user interface 100 for a user to construct visual graphics. In some implementations, the graphical user interface includes a user input module 232 for receiving user input through the natural language box 124. For example, a user inputs a natural language command or expression into the natural language box 124 to identify one or more data sources 258 (which may be stored on the computing device 200 or stored remotely) and/or data fields from the data sources. In some implementations, the natural language expression is a voice utterance captured by the audio input device 220. The selected fields are used to define a visual graphic. The data visualization application 230 then displays the generated visual graphic in the user interface 100. In some implementations, the data visualization application 230 executes as a stand-alone application (e.g., a desktop application). In some implementations, the data visualization application 230 executes within the web browser 226 or another application using web pages provided by a web server;
  - a data visualization generator 234, which automatically generates and displays a corresponding visual graphic (also referred to as a "data visualization" or a "data viz") using the user input (e.g., the natural language input);
  - a natural language system 236, which receives and parses the natural language input provided by the user. The natural language system 236 may identify analytical expressions 238, which are described in FIG. 2B.
  - the natural language system 236 may also include a dependency calculator 250, which looks up dependencies in a database 258 to determine how particular terms and/or phrases are related (e.g., dependent);
  - in some implementations, the natural language system 236 includes a filter generator 252, which determines if one or more filters are related to a field that has been modified by a user. The filter generator 252 generates the one or more filters based on user selections;
  - a widget generator 254, which generates widgets that include user-selectable options. For example, a "sort" widget is generated in response to a user selecting (e.g., hovering) over a sort field (e.g., a natural language term identified to be a sort field). The sort widget includes user-selectable options such as "ascending," "descending," and/or "alphabetical," so that the user can easily select, from the widget, how to sort the selected field; and visual specifications 256, which are used to define characteristics of a desired data visualization. In some implementations, the information the user provides (e.g., user input) is stored as a visual specification. In some implementations, the visual specifications 256 include previous natural language commands received from a user or properties specified by the user through natural language commands. In some instances, a visual specification 256 includes two or more aggregations based on different levels of detail. Further information about levels of detail can be found in U.S. patent application Ser. No. 14/801,750, filed Jul. 16, 2015, titled "Systems and Methods for using Multiple Aggregation Levels in a Single Data Visualization," and U.S. patent application Ser. No. 16/166,125, filed Oct. 21, 2018, titled "Determining Levels of Detail for Data Visualizations Using Natural Language Constructs," each of which is incorporated by reference herein in its entirety; and zero or more databases or data sources 258 (e.g., a first data source 258-1), which are used by the data visualization application 230. In some implementations, the data sources are stored as spreadsheet files, CSV files, XML files, flat files, or JSON files, or stored in a relational database. For example, a user selects one or more databases or data sources 258 (which may be stored on the computing device 200 or stored remotely), selects data fields from the data sources, and uses the selected fields to define a visual graphic.

zero or more semantic models 260 (e.g., a first semantic model 260-1), each of which is derived directly from a respective database or data source 258. The semantic model 260 represents the database schema and contains metadata about attributes. In some implementations, the semantic model 260 also includes metadata of alternative labels or synonyms of the attributes. The semantic model 260 includes data types (e.g., "text," "date," "geospatial," "Boolean," and "numeric"), attributes (e.g., a currency type such as the United States Dollar), and a semantic role (e.g., the "City" role for a geospatial attribute) for data fields of the respective database or data source 258. In some implementations, the semantic model 260 also captures statistical values (e.g., data distribution, range limits, average, and cardinality) for each attribute. In some implementations, the semantic model 260 is augmented with a grammar lexicon 262, which contains a set of analytical concepts 266 found in many query languages (e.g., average, filter, and sort). In some implementations, the semantic model 260 also distinguishes between attributes that are measures (e.g., attributes that can be measured, aggregated, or used for mathematical operations) and dimensions (e.g., fields that cannot be aggregated except by counting). Thus, the semantic model 260 helps with inferencing and choosing salient attributes and values;

a grammar lexicon 262, which includes analytical concepts 266 (see FIG. 2C) that are used to support the analytical expressions 238 for forming intermediate expressions; and zero or more data source lexicons 264 (e.g., a first data source lexicon 264-1), each of which is associated with a respective database or data source 258. Details of the components of a data source lexicon are described in FIG. 2D.

In some implementations the computing device 200 further includes an inferencing module (not shown), which is used to resolve underspecified (e.g., omitted information) or ambiguous (e.g., vague) natural language commands (e.g., expressions or utterances) directed to the databases or data sources 258, using one or more inferencing rules. Further information about the inferencing module can be found in U.S. patent application Ser. No. 16/234,470, filed Dec. 27, 2018, titled "Analyzing Underspecified Natural Language Utterances in a Data Visualization User Interface," which is incorporated by reference herein in its entirety.

In some implementations, canonical representations are assigned to the analytical expressions 238 (e.g., by the natural language system 236) to address the problem of proliferation of ambiguous syntactic parses inherent to natural language querying. The canonical structures are unambiguous from the point of view of the parser and the natural language system 236 is able to choose quickly between multiple syntactic parses to form intermediate expressions. Further information about the canonical representations can be found in U.S. patent application Ser. No. 16/234,470, filed Dec. 27, 2018, titled "Analyzing Underspecified Natural Language Utterances in a Data Visualization User Interface," which is incorporated by reference herein in its entirety.

Although FIG. 2A shows a computing device 200, FIG. 2A is intended more as a functional description of the various features that may be present rather than as a structural schematic of the implementations described herein. In practice, and as recognized by those of ordinary skill in the art, items shown separately could be combined and some items could be separated.

Figure 2B:
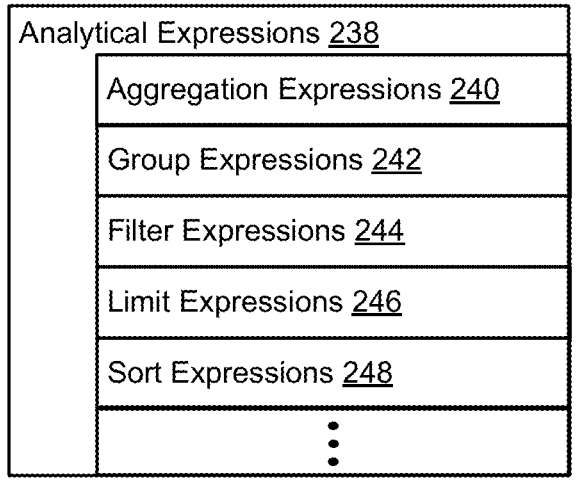

FIG. 2B is block diagram illustrating the analytical expressions 238 of the natural language system 236, in accordance with some implementations. The analytical expressions 238 include:

aggregation expressions 240. For example, "average Sales" is an aggregate expression that includes an aggregate term "average" and an attribute "Sales." In some implementations, the aggregation expressions 240 are in the canonical form [agg att], where agg∈Aggregations and att is an Attribute;

group expressions 242. For example, "by Region" is a group expression that includes a group term "by" and an attribute "Region." In some implementations, the group expressions 242 are in the canonical form [grp att], where grp∈Groups and att is an attribute;

filter expressions 244. For example, "Customer Name starts with John" is a filter expression that contains an attribute "Customer Name," a filter "starts with," and a value "John." In some implementations, the filter expressions 244 are in the canonical form [att filter val], where att is an attribute, filter∈Filters, and val∈Values;

limit expressions 246. For example, "top 5 Wineries by sum of Sales" is a limit expression that contains a limit term "top", a value "5", a group by attribute "Wineries," and an aggregation expression "sum of Sales." In some implementations, the limit expressions 246 are in the canonical form [limit val ge ae], where limit∈Limits, val∈Values, ge∈group expressions, and ae e aggregation expressions; and sort expressions 248. For example, in "sort Products in ascending order by sum of Profit," the phrase "ascending order" is the sort term, "Products" is the attribute to group by, and "sum of Profit" is the aggregation expression. In some implementations, the sort expressions 248 are in the canonical form [sort ge ae], where sort∈Sorts, ge∈group expressions, and ae e aggregation expressions.

Figure 2C:
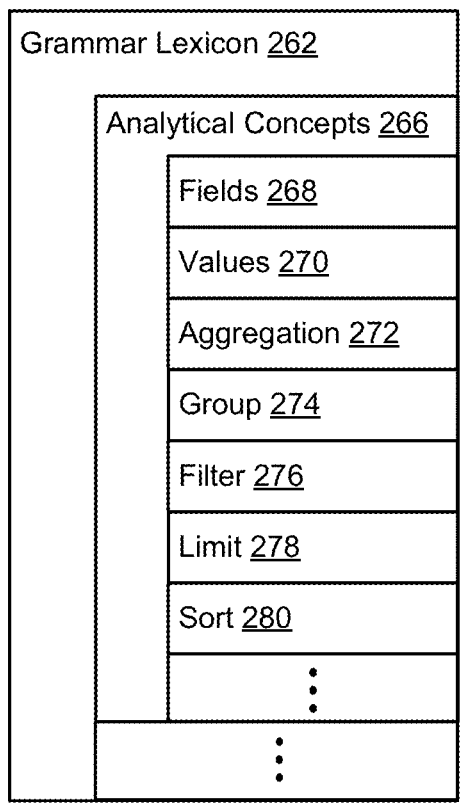

FIG. 2C is a block diagram illustrating components of a grammar lexicon 262 according to some implementations. In some implementations, the grammar lexicon comprises analytical concepts 266 that support the formation of analytical expressions 238. The analytical concepts 266 include:

- a field 268 concept, which is a finite set of database fields. Examples of field concepts include "Sales" and "Product Category";
- a value 270 concept, which is a finite set of values for a database field. Examples of value concepts include the value 10,500,000.00 for a Sales data field and the value "Chairs" for a Product Category data field;
- an aggregation 272 concept, which is a finite set of operators that aggregate the values of multiple rows to form a single value based on a mathematical operation. Examples of aggregation concepts include "sum," "average," "median," "count," and "distinct count";
- a group 274 concept, which is a finite set of operators that partitions the data into categories. An example of a group concept includes the "by" key value;
- a filter 276 concept, which is a finite set of operators that return a subset of rows from the database. Examples of filter concepts include "filter to," "at least," "between," and "at most";
- a limit 278 concept, which is a finite set of operators (akin to the filters 276) that return a subset of rows from the database, restricting to n rows, where 1≤n≤N, and N is the total number of rows in the domain. Examples of limit concepts include "top" and "bottom"; and
- a sort 280 concept, which is a finite set of operators that arranges data rows in an order. Examples of sort concepts include "ascending," "descending," and "alphabetical."

Figure 2D:
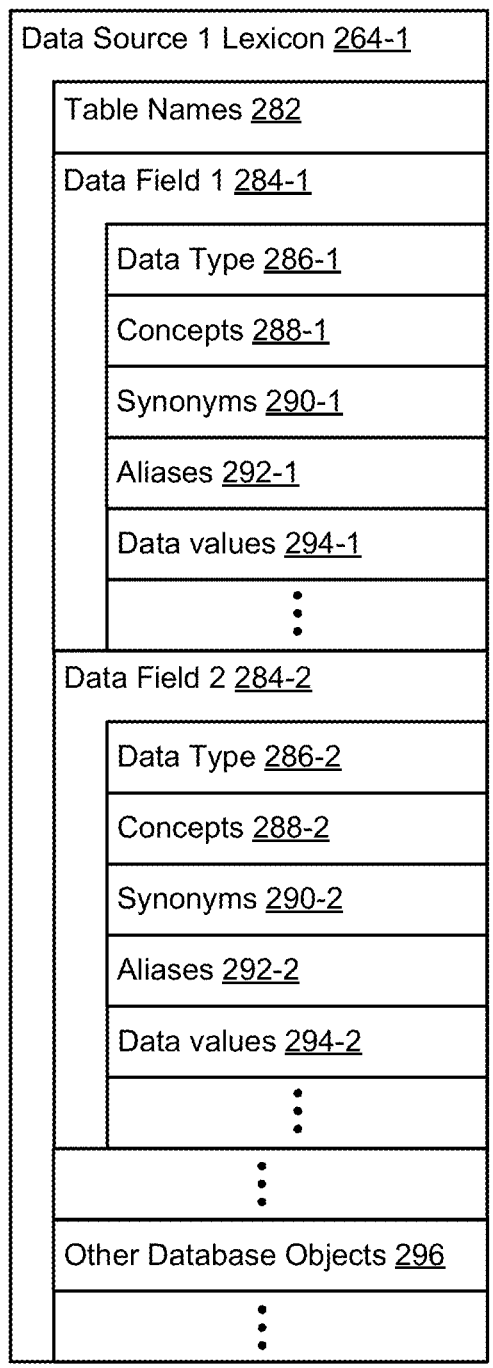

FIG. 2D is a block diagram illustrating components of a first data source lexicon 264-1, in accordance with some implementations. The first data source lexicon 264-1 includes table names 282 corresponding to names of one or more tables of the first data source 258-1, a plurality of data fields 284 of the first data source 258-1, and other database objects 296. Each data field 284 includes:

- a data type 286, such as integer, string, date, or floating point numeric;
- one or more concepts 288 that are used to interpret the data field. For example, a data value "Michael" may be interpreted using the concepts such as a "string," "name," "gender (e.g., male)," "singer," "basketball player," and/or "chef." In some implementations, the one or more concepts are derived from elastic searches;
- one or more synonyms 290, which are defined by the system. For example, a data field "average" may include synonyms such as "mean" and "avg";
- zero or more aliases 292, which are defined by the user. For example, a data field "goods" may include aliases such as "widgets," "bananas," and "my favorite field"; and
- data values 294, which are some or all of the distinct values for a data field. This is particularly useful for low cardinality string data fields. In some instances, the set of stored data values 294 for a data field 284 in a lexicon 264 is limited to data values with threshold usage in the data field 284 (e.g., include a data value 294 in the lexicon when the data value appears in at least a threshold number of rows for the data field 284).

In some implementations, a data source lexicon 264 includes other database objects 296 as well.

In some implementations, the computing device 200 also includes other modules such as an autocomplete module, which displays a dropdown menu with a plurality of candidate options when the user starts typing into the input box 124, and an ambiguity module to resolve syntactic and semantic ambiguities between the natural language commands and data fields (not shown). Details of these submodules are described in U.S. patent application Ser. No. 16/134,892, titled "Analyzing Natural Language Expressions in a Data Visualization User Interface, filed Sep. 18, 2018, which is incorporated by reference herein in its entirety.

Figure 3:
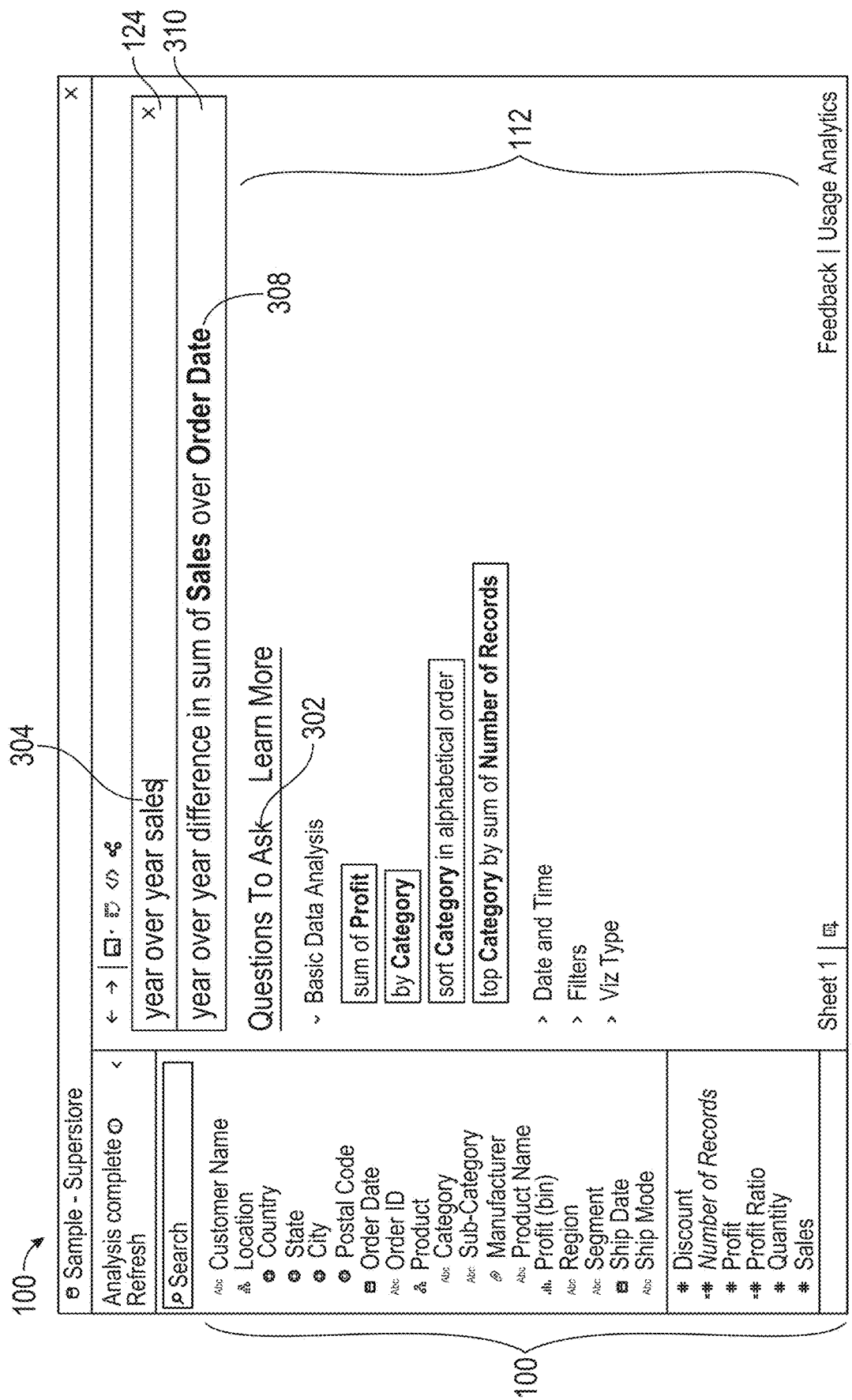
FIG. 3 provides a screenshot for a graphical user interface according to some implementations.

Each of the above identified executable modules, applications, or sets of procedures may be stored in one or more of the memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above FIG. 3 is a screen shot of a graphical user interface 100 according to some implementations. In some implementations, as illustrated in FIG. 3, the data visualization region 112 displays suggestions 302 (e.g., tips or pointers) to assist the user in interacting with the data source. Further details about the suggestions 302 are described in U.S. patent application Ser. No. 16/601,437, filed Oct. 14, 2019, entitled "Incremental Updates to Natural Language Expressions in a Data Visualization User Interface," which is incorporated by reference herein in its entirely.

In the example of FIG. 3, a user is interacting with a data source 258. The schema information region 110 provides named data elements (e.g., field names) from the data source 258, which may be selected and used to build a data visualization.

FIG. 3 illustrates a user interaction with the graphical user interface 100. In this example, the user inputs (e.g., enters or types) a natural language expression (e.g., a natural language command) 304 "year over year sales" in the command box 124. The user may also input the natural language expression by speech, which is then captured using an audio input device 220 (e.g. a microphone) coupled to the computing device 200. Typically, the natural language expression includes one or more terms that identify data fields from the data source 258. A term may be a dimension (e.g., categorical data) or a measure (e.g., a numerical quantity). As illustrated by the example, the natural language input typically includes one or more terms that correspond to data fields (e.g., the term "sales" identifies a data field from the data source).

In some implementations, parsing of the natural language expression is triggered in response to the user input. In this example, the natural language command 304 includes the terms "year over year," which specifies a table calculation type.

In response to the natural language command 304, the graphical user interface 100 displays an interpretation 308 (also referred to as a proposed action) in an interpretation box 310. In some implementations, as illustrated in FIG. 3, the field names "Sales" and "Order Date" are displayed in a visually distinctive manner (e.g., in boldface) relative to other words included in the interpretation 308.

Figure 4A:
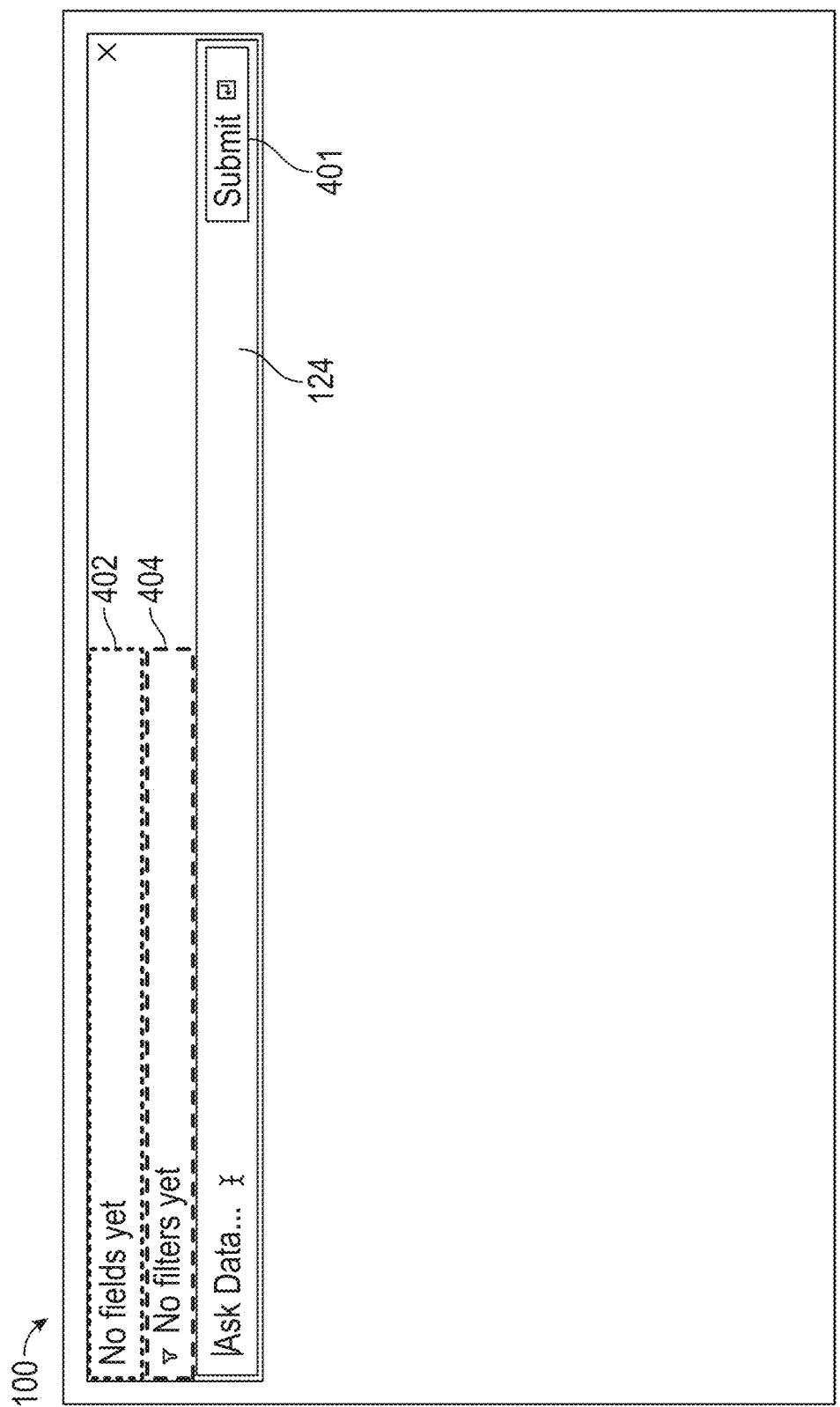
FIGS. 4A and 4B provide a series of screen shots for interactions with a graphical user interface according to some implementations.
Figure 4B:
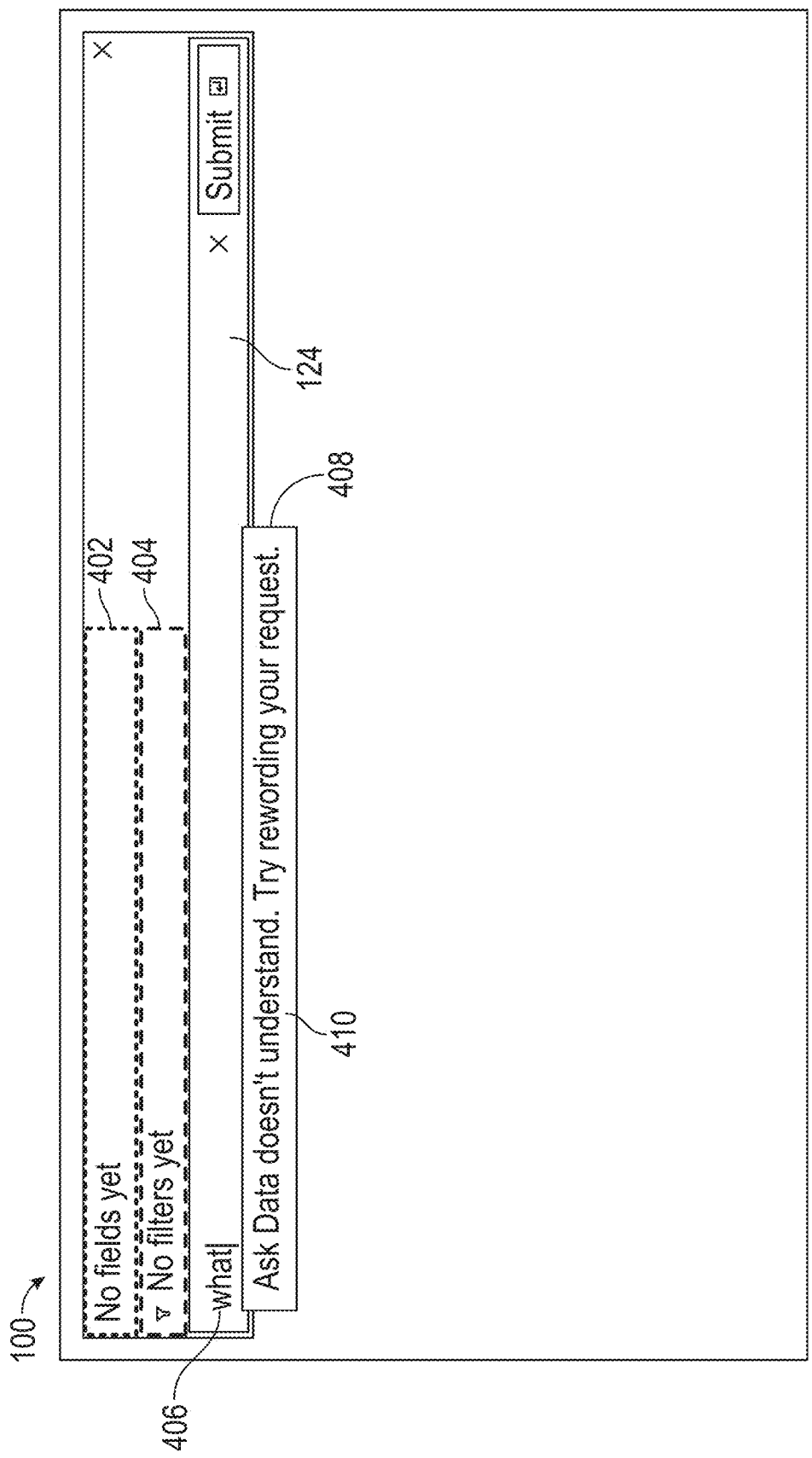

FIGS. 4A and 4B provide a series of screen shots for a graphical user interface 100 according to some implementations.

FIG. 4A provides a screen shot for a partial view of a graphical user interface 100 according to some implementations.

In some implementations, as illustrated in FIG. 4A, the graphical user interface 100 has a natural language input box 124 for receiving natural language commands from a user. The natural language input box 124 includes a graphical control element 401 (e.g., a "Submit" affordance) that, when selected by a user, causes a natural language command in the input box 124 to be transmitted to the computing system 200 (e.g., the natural language system 236) for analysis and/or interpretation. In some implementations, the computing system 200 generates a visualization (e.g., a data visualization) in response to the analysis and/or interpretation and returns the visualization for display in the graphical user interface 100. In this example, the graphical control element 401 is deactivated (e.g., grayed out) because the graphical user interface 100 has yet to receive a natural language command.

In some implementations, the graphical user interface 100 also comprises a data field interpretation region 402 and a filter interpretation region 404, which are located adjacent to (e.g., above) the natural language input box 124. The data field interpretation region 402 displays how the natural language system 236 interprets the natural language input from a user in light of the selected data source. The filter interpretation region 404 displays the filters that are applied to data fields of the data source 258 in response to the natural language input from the user. In this example, no interpretation is displayed in the regions 402 and 404 because the graphical user interface 100 has yet to receive a natural language command.

FIG. 4B illustrates a user interaction with the graphical user interface 100. In this example, the user inputs (e.g., enters or types) a partial natural language expression 406 "what" into the command box 124. In general, the expression can be a command, an input, or an utterance that includes partial or incomplete words, phrases, and/or sentences. The user may also input the natural language expression by speech, which is then captured using an audio input device 220 (e.g. a microphone) coupled to the computing device 200. In response to the natural language command 406, the graphical user interface 100 displays a dropdown menu 408 that includes a statement 410 (e.g., "Ask Data does not understand. Try rewording your request.") Typically, a natural language expression includes one or more terms that identify entities (e.g., a data field, a data value of a data field, an analytical operation, and/or a data visualization type) from the data source 258. In this example, the natural language system 236 generates and displays the statement 410 because it is unable to identify an entity of the data source 258 that corresponds to the partial language expression 406.

Figure 5A:
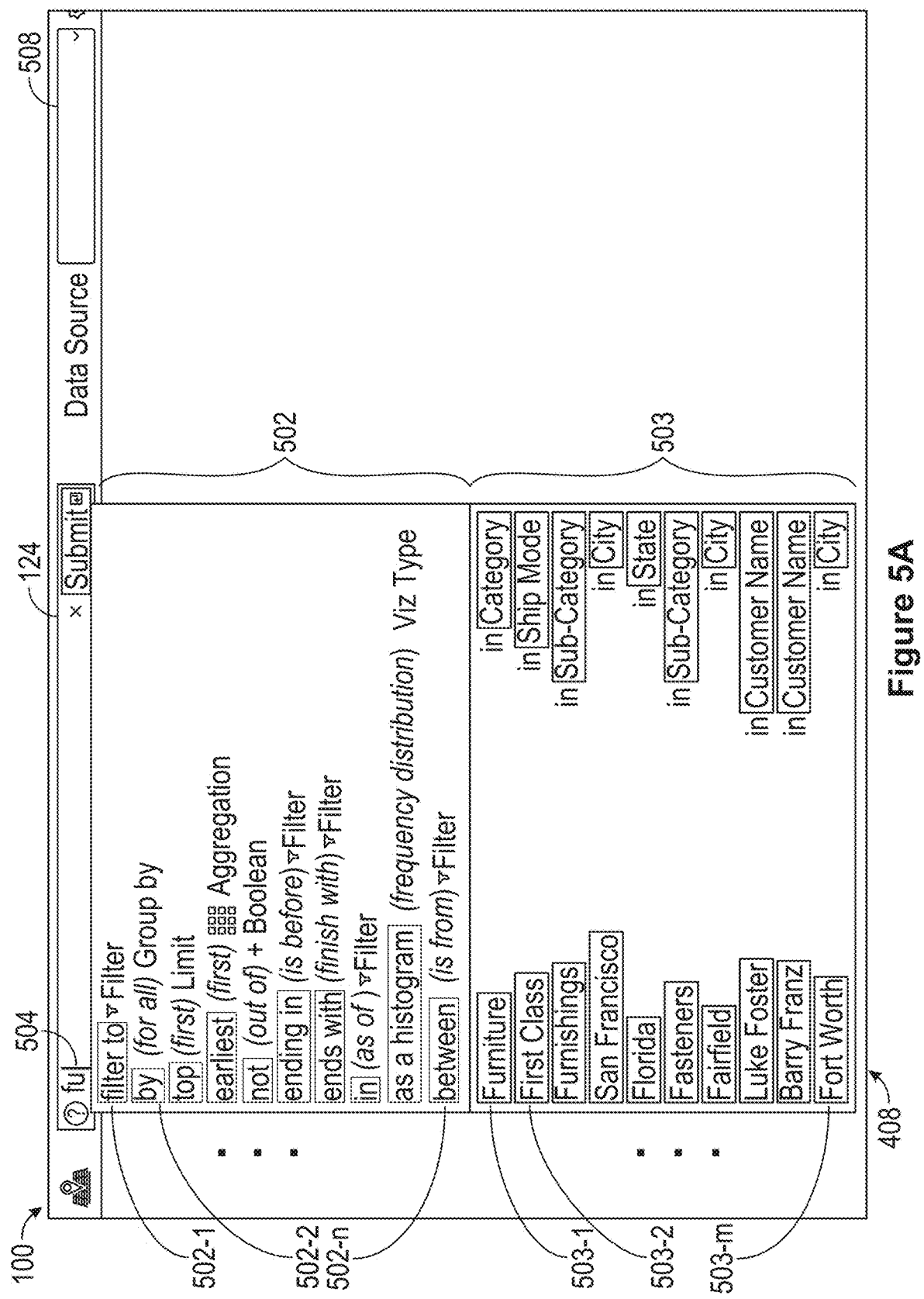
FIGS. 5A and 5B provide a series of screen shots for interactions with a graphical user interface according to some implementations.
Figure 5B:
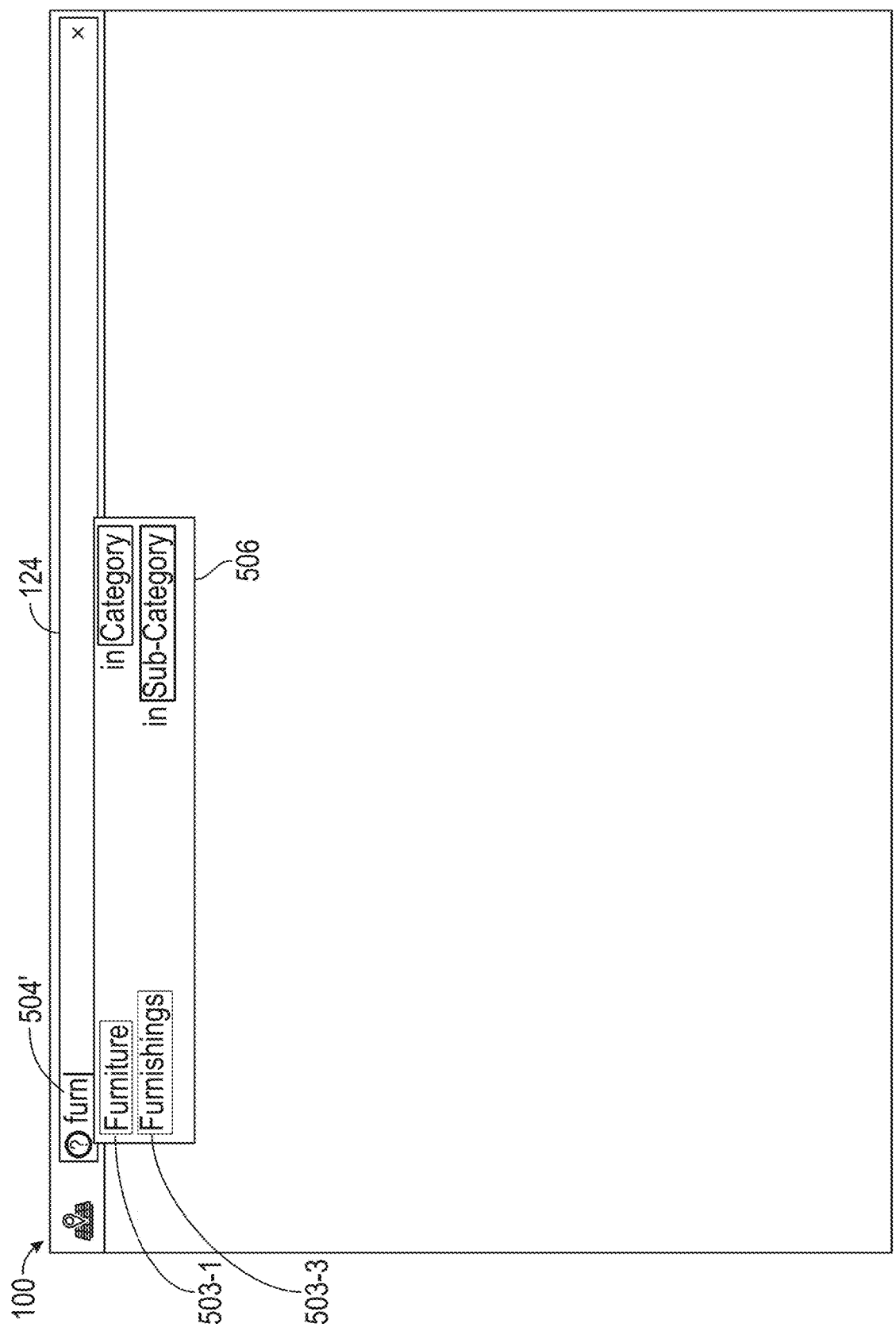

FIGS. 5A and 5B illustrates another user interaction with the graphical user interface 100. In this example, the user inputs the keystrokes 504 (e.g., "fu"). In response to the keystrokes, the graphical user interface 100 displays a plurality of entity interpretations 503 and command interpretations 502 in the dropdown menu 408 based on what is presented in the selected data source 508 (e.g., Superstore Orders). For example, the command interpretations 502 include commands corresponding to the input "f". The list of command interpretations 502 may have the letter "f" in the command itself, or in the description of the command (e.g., the first command 502-1 is a "filter to" command, and the second command 502-2 is a group by command which filters by "for all"). The command may be an aggregation, a limit (e.g., top or first), a frequency distribution (e.g., as a histogram), or any other filter (e.g., the nth command 502-n).

Each of the entity interpretations 503 is generated by the natural language system 236 and includes an entity from the data source 258. In the example of FIG. 5A, each of the entity interpretations 503 identifies a distinct data value 503-1, 503-2, . . . , 503-m from the data source 508 and its corresponding data field. Each of the data values contains the letters "F" or "fu" corresponding to the keystrokes "fu" of the most recently entered term. For example, the first data value 503-1 recites "furniture" and shows that the data field Category contains the first data value 503-1. In another example, the data value 503-2 recites "first class," which is a data value for the Ship Mode data field. Other entity interpretations 503 may be associated with the Category or Sub-Category data fields (e.g., furniture, furnishings, or fasteners), the City data field (e.g., San Francisco, Fairfield, or Fort Worth 503-m), the State data field (e.g., Florida), or the Customer Name data field (e.g., Luke Foster or Barry Franz). As illustrated in FIG. 5A, the letters "fu" in the entity interpretations 503 are displayed in a visually distinctive manner (e.g., boldface) compared to the remaining characters of each data value 503-1.

In some implementations, as illustrated in FIGS. 5B, the horizontal position of the dropdown menu 408 changes based on the position of a most recently entered term (or keystroke) in the natural language input box 124. In this example, the user inputs additional keystrokes (i.e., the letters "rn"), which are appended to the partial natural language input "fu" in FIG. 5A. In response to the additional keystrokes, the graphical user interface 100 displays updated entity interpretations 506. Each of the entity interpretations identifies a distinct data value 503-1 or 503-3 for a data field from the data source 258.

In the example of FIG. 5B, each of the data values 503-1 and 503-3 in the entity interpretations 506 includes the letters "furn," which is a combination of the keystrokes (e.g., "fu") and the additional keystroke (e.g., the letter "rn"). In some implementations, a partial natural language input (e.g., "fu", the keystrokes "rn," or the combination of the keystrokes and the additional keystroke that forms "furn") comprise a character string. A character string may include a string of letters that forms part of a word, such as the letters "dis" of the word "distribution." A character string may be a word (e.g., "sales", "price," or "profit"). A character string may be more than one word, separated by a white space between words, such as "San Francisco." A character string may include complete words as well as letters of a word.

In the example of FIG. 5B, the keystrokes (e.g., the letters "rn") are appended to the end of the partial natural language input 504 "fu" to form the updated input "furn" 504'. In some implementations, the user may click on or select any portion of the partial natural language input and insert the keystrokes at that position.

In some implementations, the natural language system 236 generates one or more tokens from the character string. A token may include one letter (e.g., a letter of a word, such as the letter "f"), two letters, three or more letters (e.g., letters of a word, such as "furniture" or "furnishings"), one word (e.g., the word "furniture"), two or more words, and/or one or more phrases that are formed by combining two or more consecutive words. A token generally represents a semantically meaningful string, and is typically separated from other tokens by whitespace or punctuation.

Referring again to FIG. 5B, the natural language system 236 expands the keystrokes "furn" to form the token "furniture" (e.g., a word), or "furnishings" (e.g., a word) and interprets the token according to the data source 508 and/or a lexicon 264 for the data source 508. The user then has the option to select which of the tokens is the intended token. The process of tokenization is also described in U.S. patent application Ser. No. 16/166,125, filed Oct. 21, 2018, titled "Determining Levels of Detail for Data Visualizations Using Natural Language Constructs," which is hereby incorporated by reference herein in its entirety.

As shown in FIG. 5B, a subset 506 of the interpretations overlap with (e.g., are the same as) the interpretations 503 that are illustrated in FIG. 5A. For example, the interpretation 503-1 and the interpretation 503-3 both specify data values that include the partial user entry "furn", although they are in different data fields (i.e., "Category" and "Sub-Category"). In some implementations, some of the interpretations are different from the previous interpretations. Furthermore, the order in which an interpretation is displayed can change as a result of an additional keystroke in the partial natural language input. For example, the data value 503-3 "Furnishings," which appears as the third item in the interpretations 503 in FIG. 5A, is displayed as the second interpretation 503-3 in FIG. 5B.

In some implementations, the order of the entity interpretations in the list depends on estimated probabilities of selection by the user. Because of this, a given entity interpretation can move up or down on the list based on additional keystrokes.

In some implementations, when one or more terms in the partial natural language command include one or more terms that are recognized by the natural language system 236, the graphical control element 401 becomes activated. A user may at this point select the graphical control element 401 to cause the partial natural language command in the input box 124 to be transmitted to the data visualization application 230 for analysis (using the first interpretation). Alternatively, the user may continue to modify the partial language command, such as providing additional keystrokes, modifying or deleting existing terms, and/or selecting an alternative interpretation.

In some implementations, a user can interact with (e.g., hover over, click, or select) the graphical user interface 100 using an input device such as a mouse. In some implementations, the data visualization application 230 also includes one or more keyboard shortcuts, which provide an alternative (or additional) way for the user to interact with the graphical user interface 100. In some implementations, the keyboard shortcuts include one or more of: the <Tab> key (to move to the next option), the <Down> key (e.g., the down arrow key on the keyboard, to move to the next option), the <Up> key (e.g., the up arrow key on the keyboard, to move up on the list of options), and the <Enter> key (to select the currently highlighted interpretation).

Figure 6:
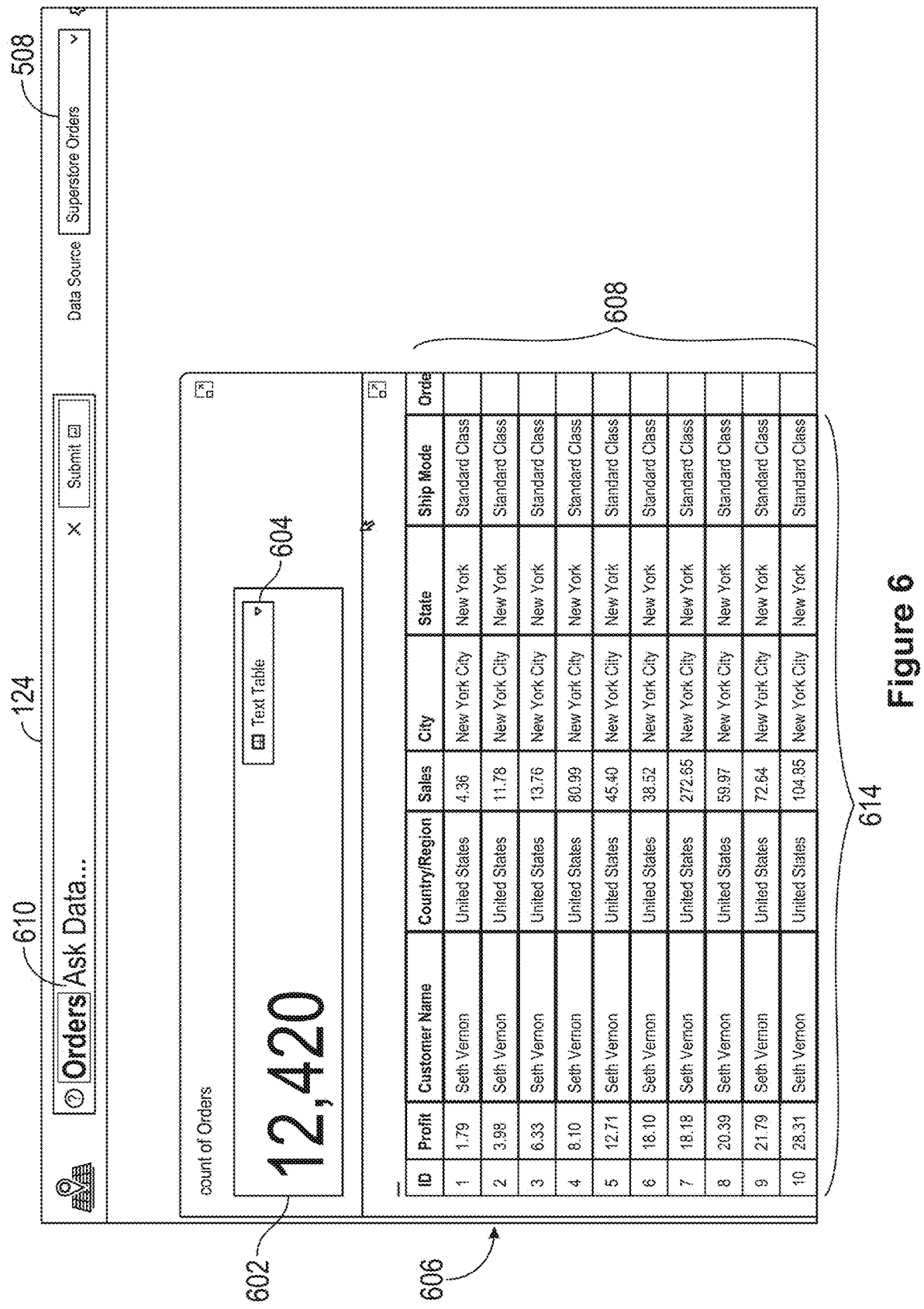
FIG. 6 provides a screen shot for an interaction with a graphical user interface according to some implementations.

FIG. 6 provides a screen shot for an interaction with a graphical user interface according to some implementations. FIG. 6 illustrates user specification of a natural language expression that includes the concepts "Orders" 610 in the input box 124. The generated dashboard automatically includes one or more data visualizations based on the user input and interpretations. In some implementations, the dashboard includes multiple graphics corresponding to the natural language expression. In some implementations, based on the user input into the input box 124, the computing system automatically displays multiple visualizations most suitable for the request.

For example, a text table 602 displays the "Count of Orders." In this example, the text table 602 is a single monetary number that summarizes all of the orders present in the data source 508 (e.g., Superstore Orders). In this example, the single value represented in the text table 602 is the most requested visualization for orders. In some implementations, the interface provides a table drop-down menu 604, enabling the user to select a different visualization type for the data (e.g., a bar chart or a line graph). In some implementations, the dashboard presents only one visualization. In some implementations, the dashboard presents one or more additional visualizations. In some implementations, the concept "Orders" 610 is a table in the data source 508.

In some implementations, a second visualization 606 presents the data as a table visualization. This table visualization has a plurality of rows 608 and columns 614 corresponding to a data table in the data source 508. In some implementations, the second visualization 606 is scrollable horizontally and/or vertically as needed, providing more rows and columns to the user interface. In some implementations, the scrollable feature enables a user to scroll up/down and left/right to explore data rows and columns. In some implementations, the table is fully virtualized, and the graphical user interface renders just the relevant rows and columns according to the scroll locations. This allows the graphical user interface to display large quantities of data rows/columns without bogging down the rendering of the browser/interface. In this example, the second visualization 606 is presented second, because it is not the closest match (i.e., it is not the most commonly requested or the most closely related to the requested data).

Figure 7:
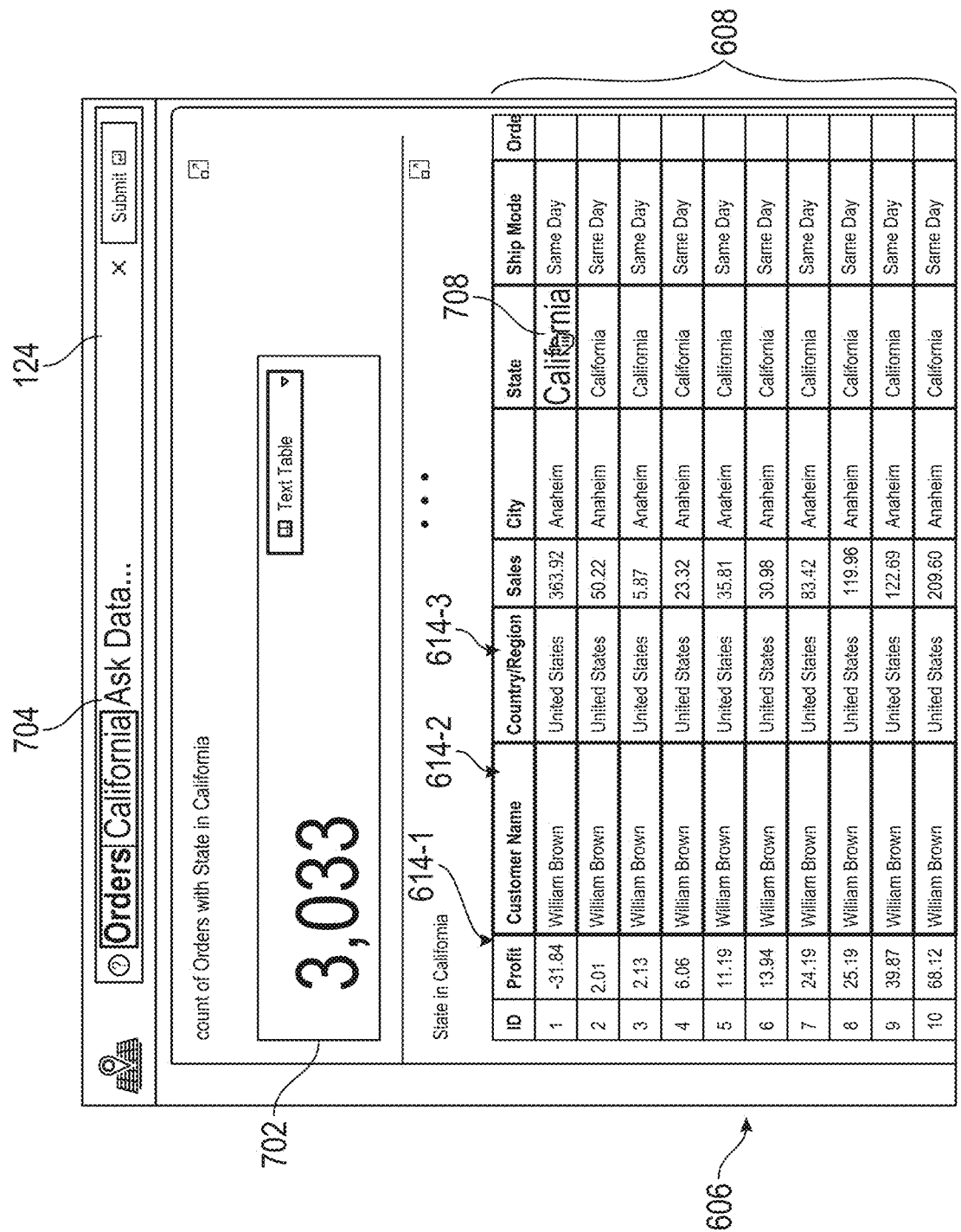
FIG. 7 provides a screen shot for an interaction with a graphical user interface according to some implementations.

FIG. 7 provides a screen shot for an interaction with a graphical user interface according to some implementations. In this example, the second visualization 606 has a plurality of rows 608 and a plurality of columns 614-1, 614-2, 614-3, . . . . In some implementations, the user interacts with the rows and columns. In some implementations, the user interaction is a selection of a specific data field of the second visualization. For example, the user selects a specific data field 708. In this example, when the user selects a specific data field 708, the input box 124 automatically updates with the selected data field 708. In this example, the input box 124 includes the second concept 704 "California."

In some implementations, after the selection has been added to the input box 124, the user interface automatically updates the first visualization 702 and the second visualization 606 to reflect the additional concept 704. In some implementations, the user must first accept (e.g., enter, search, or filter) the additional concept 704 before the first or second visualizations update. In some embodiments, the first visualization 702 is updated to reflect the "count of orders with state in California." In some implementations, the second visualization 606 updates the plurality of rows and columns to reflect only the data for the orders in the state of California.

Figure 8A:

FIGS. 8A-8B provide a series of screen shots for interactions with a graphical user interface according to some implementations. Specifically, FIGS. 8A and 8B illustrate another example of selecting a data field to filter the data source. In this example, the second visualization 606 has been updated to second visualization 804 to reflect the second concept 704 "California." In some implementations, the second visualization 804 is scrolled to the right to visualize the different columns. In some implementations, a finite number of columns are present in the second visualization on the user interface (e.g., 9 columns at a time or a number that depends on column widths). In some implementations, a fourth column 614-4 includes a plurality of data items. In some implementations, the user may interact with the data items by selecting one or more of the data items. In some implementation, when the user hovers the mouse over the data item 806, the data item is bolded (e.g., highlighted or underlined). In some implementations, the user selects the data item 806.

In FIG. 8B, upon selecting the data item 806, the input box 124 automatically updates with the selected data item 818. In some implementations, the plurality of visualizations are updated based on the newly selected data item. In this example, the first data visualization 810 is updated to reflect the "count of Orders with State in California and filter Category to Technology" 814. In some implementations, the second visualization 812 is updated to reflect a table with rows and columns of data relating to the "State in California and filter Category to Technology" 816. In some implementations, the more concepts that are added to the input box 124, the fewer the number of rows in the second visualization 812.

Figure 9:
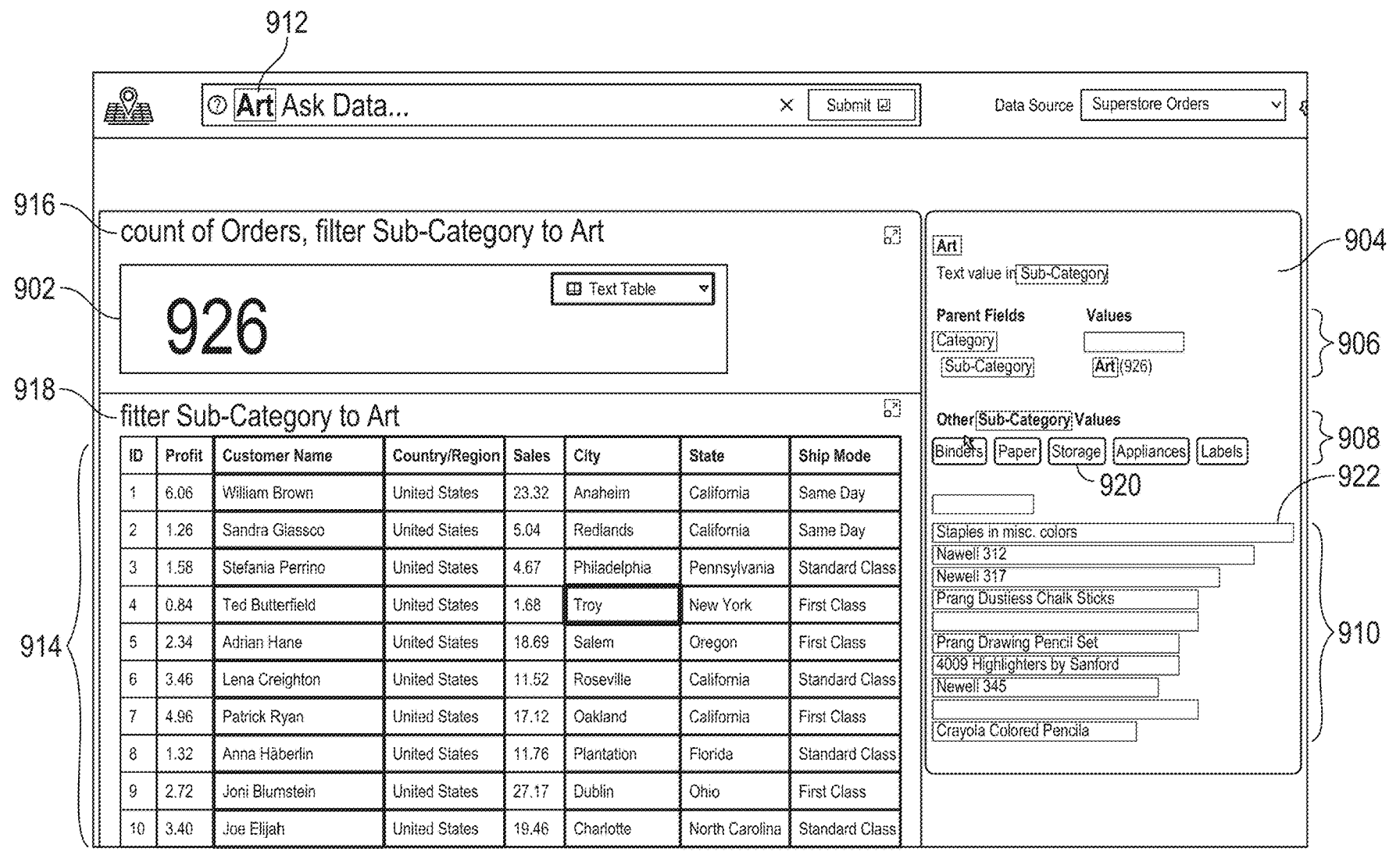

FIG. 9 provides a screen shot for an interaction with a graphical user interface according to some implementations. FIG. 9 illustrates another method of searching for a data value in the input box 124. In this example, the user may input text relating to a Category or a Sub-Category (e.g., art). In some implementations, the user may not be asking a question, or making a statement, but may want general information about a Category or Sub-Category. In this example, the user inputs the text 912 "art" into the input box 124. In response to the text 912, the dashboard updates the first visualization 902 to reflect the "count of Orders, filter Sub-Category to Art" 916. In some implementations, the second visualization 914 is updated to reflect "filter Sub-Category to Art" 918. In some implementations, a window 904 presents the user with data relating to or containing the text 912 "art." For example, "Art" is a Sub-Category data value, and there are many Product Name data values 910 related to "Art."

In some implementations, the window 904 displays the hierarchical relationships 906 of the relevant data fields and the relevant data values (e.g., "Sub-Category" is a child field of Category, and the "Art" data value is within the Category of "Office Supplies"). In some implementations, the window 904 presents additional data values 908 for the same data field (data values for Sub-Category). For example, the additional values 908 in the Sub-Category data field are "Binders," "Paper," "Storage" 920, "Appliances," and "Labels." In some implementations, data values for child data fields may be presented. These data values 910 are for Product Names within the "Art" Sub-Category, such as the Product Name "Staples in misc. colors" 922.

related to the selected value "Art." In some implementations, a data value may be commonly associated with the text 912 (e.g., the most commonly purchased items with the selected data value, the data values needed with the selected data value, or applications or supplemental items for the selected data value).

Figure 10:
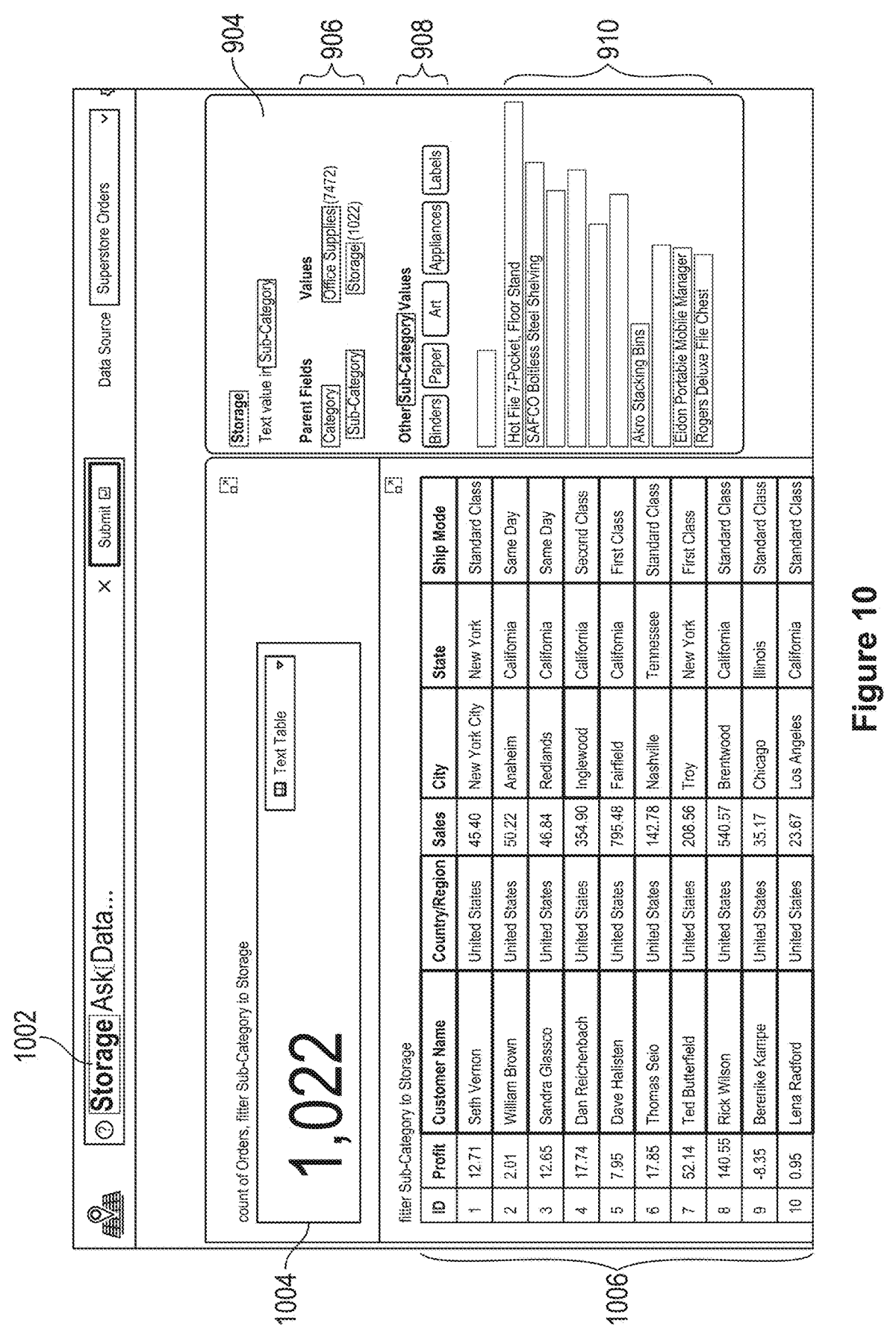

As shown in FIG. 10, a user has selected the data value "Storage" 920 from FIG. 9. The dashboard updates to reflect the selected data value 920. In some implementations, the input box 124 is automatically updated to reflect the user selection. Here, the selected data value 920 is displayed as the concept 1002 "Storage" in the input box 124. The first visualization 1004 now shows a total count of the orders for the Sub-Category "Storage." The visualization 1004 may be further filtered by providing more information in the input box (e.g., by year, by region or state, or by customer). The second visualization 1006 updates to present data in a table visualization for rows whose Sub-Category data values match the selected data value "Storage."

Figure 11B:
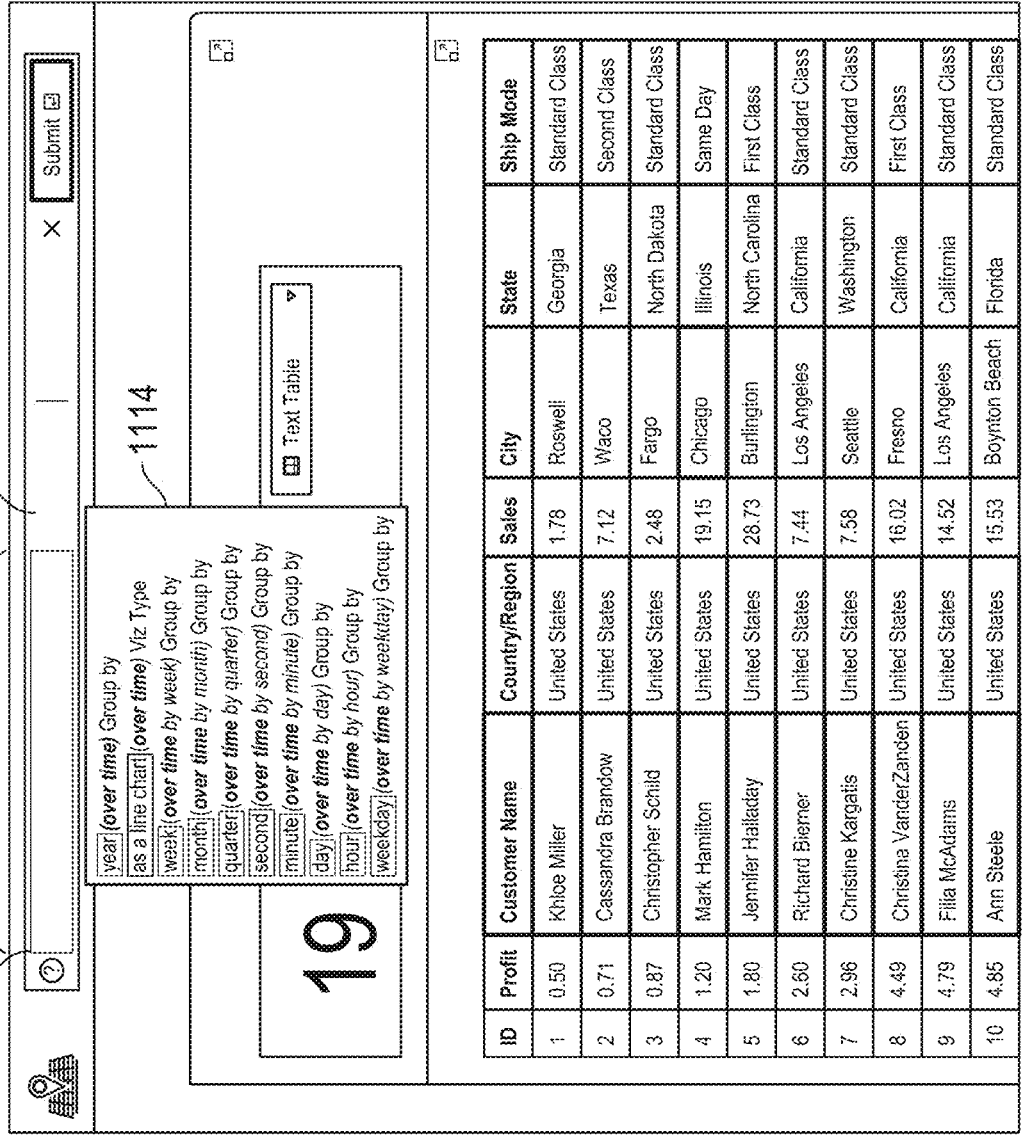

FIGS. 11A and 11B provide a series of screen shots for interactions with a graphical user interface according to some implementations. FIG. 11A illustrates that the dashboard updates to reflect a selection from the values related to Art 910 (see FIG. 9, Product Name data value 922). Upon selection of the "Staples with misc. colors" data value 922, the input box 124 is automatically updated to reflect the user selection. Whereas selecting the "Storage" data value 920 replaced the selection of the "Art" data value (they are both Sub-Categories), selection of the "Staples in misc. colors" 922 Product Name does not lead to replacement. The data value 922 for Product Name is in the "Art" Sub-Category, so both the Sub-Category data value "Art" and the Product Name data value "Staples in misc. colors" are displayed in the input box 124 as the concepts "Art" 912 and "Staples with misc. colors" 1102.

The first visualization 1104 now shows the total "count of orders, filter Product Name to Staples in misc. colors and filter Sub-Category to Art" 1108. The first visualization 1104 may be further filtered by providing more information in the input box (e.g., by year, by region or state, or by customer). The second visualization 1106 is updated to present data in a table visualization, filtered according to the two filters, as explained by the visualization description 1110.

FIG. 11B illustrates a user's ability to update the natural language input. For example, the user may add additional information to the input box 124 to filter the information being presented in the dashboard, or to display the data in a different way. In FIG. 11B, the user has entered "over time" 1112 into the input box 124. The computing system provides interpretations for the user's input in a drop down window 1114. Each interpretation specifies either a unit of time or a visualization type. In some implementations, the drop down window 1114 suggests a filter based on the input. The phrase "Group by" in most of the interpretations indicates that the Orders data will be grouped according to a specified unit of time.

Figure 12:
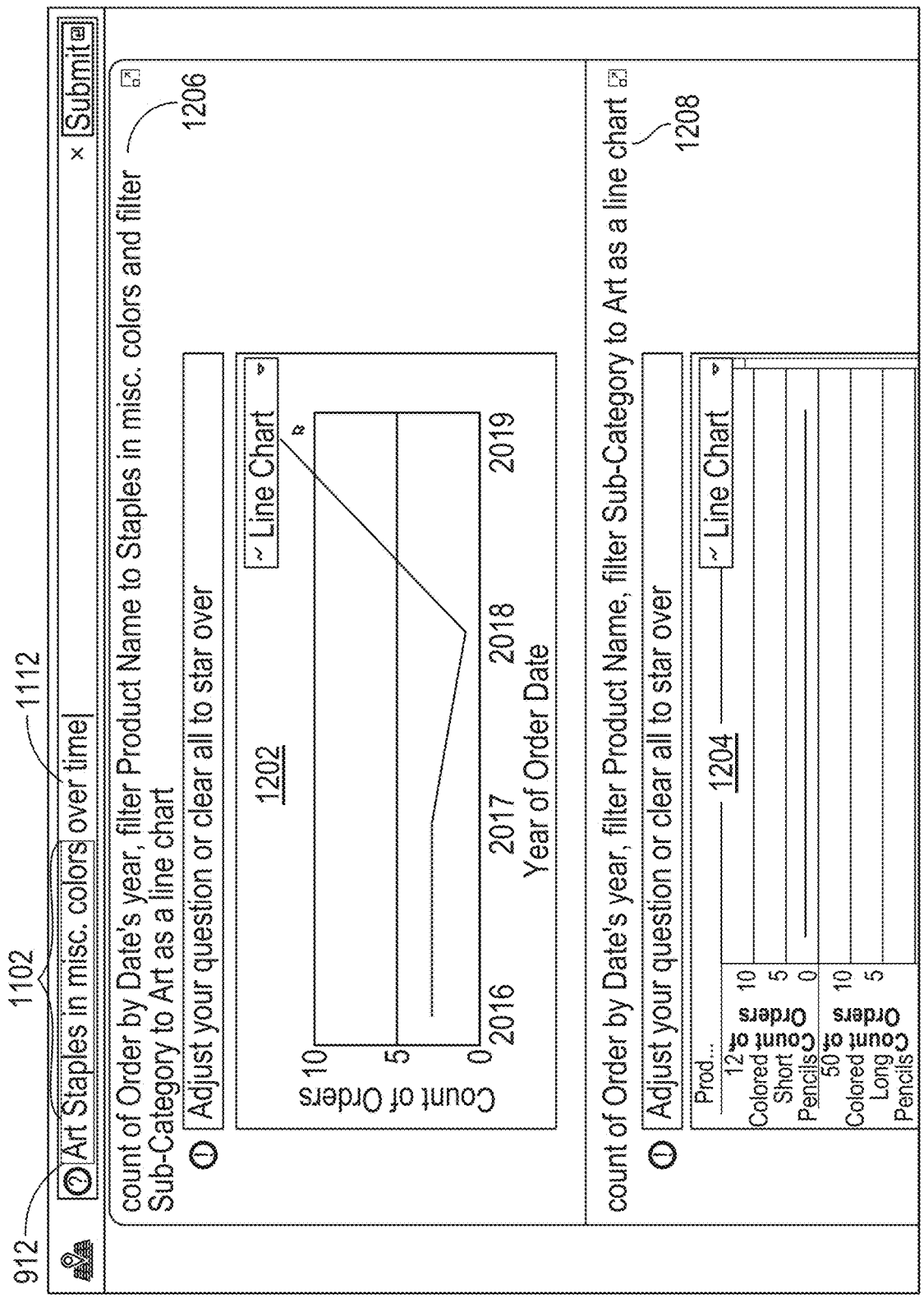
FIG. 12 provides a screen shot for an interaction with a graphical user interface according to some implementations.
Figure 13A:
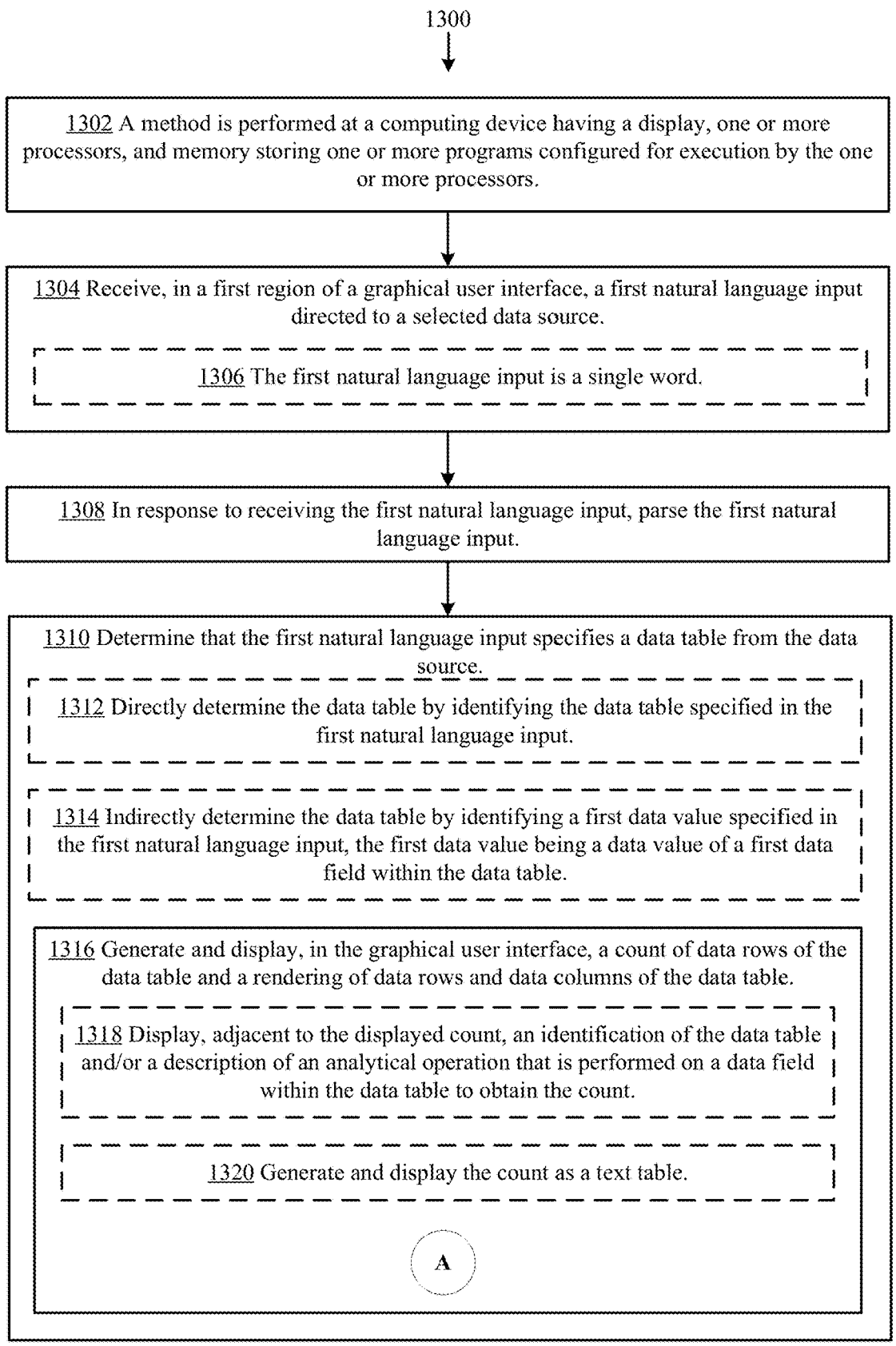

Based on the "over time" 1112 input, the system chooses two interpretations by default: (i) Group by="year" and (ii) Viz Type="line chart." This is shown in FIG. 12. This default behavior is consistent with how people analyze data: when viewing data over time, it is most common to break down the data into years and display the data as a line chart. In addition, to view data over time, the system has to use a date data field from the data source. In this case, the user has not selected a specific date field, so the system selects one based on prior usage, user preferences, or estimated relevance. Here, the default is to use "Order Date," which the user can change, if desired.

In this example, the first visualization 1202 shows a line graph of the count of orders across years according to the caption 1206. The phrase "over time" is translated into grouping into years based on "Order Date." Additionally, as shown in second visualization 1204, another line chart is presented that provides a separate line chart for each distinct Product Name. The second data visualization is generated according to its caption 1208.

FIGS. 13A-13E provide a flow chart of systems and methods for generating a dashboard to analyze data according to some implementations. The method 1300 is performed (1302) at a computing device having a display, one or more processors, and a memory storing one or more programs configured for execution by the one or more processors. The device receives (1304), in a first region (e.g., a natural language input region) of a graphical user interface, a first natural language input (e.g., an utterance, a command, or a question). For example, the natural language input can be a phrase such as "Furniture sales in California." It can also be a question such as "Where do we sell the most paper?" The input is directed to a data source. In some instances, the first natural language input is (1306) a single word, such as "Orders" or "Art."

In response to receiving the first natural language input, a computing device parses (1308) the first natural language input.

The computing device determines (1310) that the first natural language input specifies a data table from the data source. In some instances, the computing device directly determines (1312) the data table by identifying the data table specified in the first natural language input. In some instances, the computing device indirectly determines (1314) the data table by identifying a first data value specified in the first natural language input. The first data value is a data value of a first data field within the data table.

In response to the determination, the computing device generates (1316) and displays (1316) in the graphical user interface, a count of data rows of the data table and a rendering of data rows and data columns of the data table. In some implementations, the computing device displays, in the graphical user interface, a dashboard that includes the first count and the first rendering. In some implementations, the graphical user interface includes a scrollable feature that enables a user to scroll up/down and left/right to explore data rows and columns. In some instances, the table is fully virtualized, and the graphical user interface renders just the rows and columns that are displayed at the time. This allows the graphical user interface to display large quantities of data rows/columns without bogging down the rendering of the browser/interface. In some implementations, the computing device displays (1318), adjacent to the displayed count, an identification of the data table and/or a description of an analytical operation (e.g., a sum, a filter, or a sort) that is performed on a data field within the data table to obtain the count. In some implementations, the computing device generates (1320) and displays the count as a text table.

In some implementations, the first natural language input identifies (1322) a first data value of a first data field in the data table. In response, the computing device filters the data rows of the data table to a first subset of data rows whose data value for the first data field match the first data value. Additionally, the computing device displays a first count of the first subset of data rows. Additionally, the computing device displays a rendering of the first subset of data rows.

In some implementations, the computing device generates (1324) and displays, in a second region of the graphical user interface, a first entity profile corresponding to the first data value. The first entity profile identifies one or more of: the first data field (e.g., the data field to which the first data value corresponds, such as the data field "Sub-Category" for the data value "Art"), a parent field of the first data field (e.g., the data field "Category" is a parent of the data field "Sub-Category"), one or more sibling values of the first data field (i.e., other data values of the same data field as the selected data value, such as the "Sub-Category" sibling values "binders," "paper," "Storage," "Appliances," and "Labels" for the data value "Art"), and one or more child values related to the first data value (e.g., Product Name values related to art, such as "Staples in misc. colors," "Newell 312," and "Newell 317"). In some implementations, the entity profile shows relationships between the first data value and other data values.

In some implementations, the first entity profile includes (1326) a count of rows of the data table that have a valid (e.g., non-null) value for the first data field (e.g., a count of rows of the data table whose value of the first data field is not null) and/or a count of rows of the data table whose value of the first data field matches the first data value.

In some instances, the computing device receives (1328) user selection of a first sibling value of the sibling values in the first entity profile. In response to the user selection of the first sibling value, the computing device modifies the first natural language input by replacing the first data value with the first sibling value in the first region (e.g., the replacing is done automatically and without user intervention). In some implementations, in response to the user selection of the first sibling value, the computing device generates and displays, in the graphical user interface, an updated count of data rows of the data table whose value of the first data field matches the first sibling value, and an updated rendering of the data table consisting of rows whose data value for the first data field match the first sibling value.

The computing device then generates (1330) a second entity profile corresponding to the first sibling value (e.g., "Storage"). The second entity profile identifies one or more of: the first data field, the parent field, other data values of the first data field (e.g., including the first data value), and one or more child values related to the first sibling value. The computing device then replaces display of the first entity profile with the second entity profile in the second region.

In some instances, the computing device receives (1332) user selection of a first child value of the child values in the first entity profile. In response to the user selection of the first child value, the computing device modifies the first natural language input by appending the first child value to the first natural language input in the first region (e.g., the modified first natural language input includes both the first natural language input and the first child value). Additionally, the computing device generates and displays, in the graphical user interface, a third count of data rows of the data table based on further filtering the data rows of the data table from the first subset to a third subset of data rows whose child value of the first data value matches the first child value, and a rendering of the third subset of data rows.

In some instances, within the rendering of the first subset of data rows, the computing device receives (1334) user selection of a second data value of a second data field in the data table (e.g., user selection of a cell in the table). In response to the user selection the computing device appends, automatically and without user intervention, the second data value to the first natural language input in the first region of the graphical user interface. The computing device further filters the data rows of the data table from the first subset of data rows to a second subset of data rows whose data value for the second data field match the second data value. The computing device updates the display from the first count to a second count of the second subset of data rows.

In some instances, the computing device detects (1336) user interaction with the second count (e.g., detecting a user hovering over the second count). In response to detecting the user interaction, the computing device displays a pop-up data widget (e.g., a "tool tip"). In some implementations, the pop-up data widget identifies one or more data values according to which the second subset of data rows has been filtered. In some implementations, the pop-up data widget identifies, for each of the one or more data values, a respective data field to which the respective data value belongs. The one or more data values include the second data value.

In some implementations, the first natural language input identifies (1338) the data table. Within the rendering of the first subset of data rows, the computing device receives user selection of a third data value of a third data field in the data table (e.g., user selection of a cell in the table, such as "Technology", "Phones," or "California"). In response to the user selection, the computing device appends, automatically and without user intervention, the third data value to the first natural language input in the first region of the graphical user interface. The computing device filters the data rows of the data table to a fourth subset of data rows whose data value for the third data field match the third data value. The computing device updates the count to a fourth count of the third subset of data rows.

In some implementations, the count in the text table is obtained by grouping the rows of the data source according to the values of a data field. For example, in some instances, the computing device groups the data source according to values of the data fields "City" and "State." In some implementations, the computing device deduplicates the data rows (if there are any duplicates) in the data table data prior to displaying them in the graphical user interface. In some implementations, the graphical user interface includes a de-duplication toggle button (e.g., icon, affordance, user interactive element etc.) that, when selected, toggles between a count of all data rows and a distinct count of unique data rows.

In some instances, the computing device receives (1340) user input in the first region specifying removal of the one or more additional terms. In response to the user input, the computing device generates and displays, in the graphical user interface, the count of data rows of the data table and the rendering of data rows and data columns of the data table.

In some instances, the computing device receives (1342), in the first region, user input of one or more additional terms that are appended to the first natural language input. In response to receiving the one or more additional terms, the computing device parses the first natural language input and the additional terms. When one or more additional terms contain an analytical term specifying aggregation, group, limit, or filter, the computing device generates a first data visualization having a first data visualization type according to the first natural language input and the analytical term. In some implementations, the computing device replaces the display of the count and the rendering in the graphical user interface with the first data visualization. In some implementations, the table visualization feature seamlessly integrates with the data visualization pipeline. A user may also enter cues about how to display the data (e.g., the user appends the phrase "over time"). The user interface automatically generates and displays a data visualization according to the entered cues, such as showing how the data has changed over time.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method, comprising:
   at a computing device having a display, one or more processors, and memory storing one or more programs configured for execution by the one or more processors:
   receiving, in a first region of a graphical user interface, a first natural language input directed to a selected data source;
   in response to receiving the first natural language input, parsing the first natural language input;
   in accordance with the parsing, determining that the first natural language input specifies a data table from the data source indirectly by identifying a first data value specified in the first natural language input, the first data value being a data value of a first data field within the data table;
   in accordance with the determining, generating and displaying in the graphical user interface:
      a total count of all data rows of the data table; and
      an interactive visualization of the data table, wherein the interactive visualization (1) includes a plurality of data rows and data columns of the data table and (2) is scrollable horizontally and/or vertically so as to provide more data rows and/or data columns to the graphical user interface; and
   displaying, adjacent to the displayed count:
      an identification of the data table; and/or
      a description of an analytical operation that is performed on a data field within the data table to obtain the total count.

2. The method of claim 1, wherein generating and displaying the total count comprises generating and displaying the total count as a text table.

3. The method of claim 1, further comprising:
   receiving, in the first region of the graphical user interface, user specification of a first data value of a first data field in the data table; and
   in response to the user specification:
      filtering the data rows of the data table to a first subset of data rows whose data value for the first data field match the first data value;

displaying a first count of the first subset of data rows; and displaying a rendering of the first subset of data rows.

4. The method of claim 3, further comprising:

within the rendering of the first subset of data rows, receiving user selection of a second data value of a second data field in the data table; and in response to the user selection:

appending, automatically and without user intervention, the second data value to the first natural language input in the first region of the graphical user interface;

further filtering the data rows of the data table from the first subset of data rows to a second subset of data rows whose data value for the second data field match the second data value; and updating the display from the first count to a second count of the second subset of data rows.

5. The method of claim 4, further comprising:

detecting a user interaction with the second count; and in response to detecting the user interaction, displaying a pop-up data widget that (1) identifies one or more data values according to which the second subset of data rows has been filtered and (2) identifies, for each of the one or more data values, a respective data field to which the respective data value belongs;

wherein the one or more data values include the second data value.

6. The method of claim 3, further comprising:

generating and displaying, in a second region of the graphical user interface, a first entity profile corresponding to the first data value, the first entity profile including identification of one or more of:

the first data field;

a parent field of the first data field;

one or more sibling values of the first data field; and one or more child values related to the first data value.

7. The method of claim 6, wherein the first entity profile further includes:

a count of rows of the data table that have a valid value for the first data field; and/or a count of rows of the data table whose value of the first data field matches the first data value.

8. The method of claim 6, wherein generating and displaying the first entity profile includes generating and displaying a first sibling value of the one or more sibling values, the method further comprising:

receiving user selection of the first sibling value; and in response to the user selection of the first sibling value:

modifying the first natural language input by replacing the first data value with the first sibling value in the first region; and generating and displaying in the graphical user interface:

an updated count of data rows of the data table whose value of the first data field matches the first sibling value; and an updated visualization of the data table consisting of rows whose data value for the first data field match the first sibling value.

9. The method of claim 8, further comprising:

generating a second entity profile corresponding to the first sibling value, the second entity profile including identification of one or more of:

the first data field;

the parent field;

other data values of the first data field; and one or more child values related to the first sibling value; and replacing display of the first entity profile with the second entity profile in the second region.

10. The method of claim 6, further comprising:

receiving user selection of a first child value of the child values in the first entity profile; and in response to the user selection of the first child value:

modifying the first natural language input by appending the first child value to the first natural language input in the first region; and generating and displaying in the graphical user interface:

a second count of data rows of the data table based on further filtering the data rows of the data table from the first subset to a second subset of data rows whose child value of the first data value matches the first child value; and a rendering of the second subset of data rows.

11. The method of claim 1, further comprising:

within the interactive visualization of the data table, receiving user selection of a second data value of a second data field in the data table; and in response to the user selection:

appending, automatically and without user intervention, the second data value to the first natural language input in the first region of the graphical user interface;

filtering the data rows of the data table to a subset of data rows whose data value for the second data field match the second data value; and updating the count to a second count of the subset of data rows.

12. The method of claim 1, further comprising:

receiving, in the first region, user input of one or more additional terms that are appended to the first natural language input;

in response to receiving the one or more additional terms, parsing the first natural language input and the additional terms;

in accordance with a determination that the one or more additional terms contain an analytical term specifying aggregation, grouping, limiting, or filtering:

generating a first data visualization, distinct from the interactive visualization, the first data visualization having a first data visualization type according to the first natural language input and the analytical term; and replacing display of the total count and the interactive visualization in the graphical user interface with the first data visualization.

13. The method of claim 12, further comprising:

receiving user input in the first region specifying removal of the one or more additional terms; and in response to the user input, generating and displaying in the graphical user interface:

the total count of all the data rows of the data table; and the interactive visualization of the data table.

14. The method of claim 1, wherein the first natural language input is a single word.

15. A computing device, comprising:

one or more processors; and memory coupled to the one or more processors, the memory storing one or more programs configured to be executed by the one or more processors, the one or more programs including instructions for:

receiving, in a first region of a graphical user interface, a first natural language input directed to a selected data source;
in response to receiving the first natural language input, parsing the first natural language input;
in accordance with the parsing, determining that the first natural language input specifies a data table from the data source indirectly by identifying a first data value specified in the first natural language input, the first data value being a data value of a first data field within the data table;
in accordance with the determining, generating and displaying in the graphical user interface:
a total count of all data rows of the data table; and
an interactive visualization of the data table, wherein the interactive visualization (1) includes a plurality of data rows and data columns of the data table and (2) is scrollable horizontally and/or vertically so as to provide more data rows and/or data columns to the graphical user interface; and
displaying, adjacent to the displayed count:
an identification of the data table; and/or
a description of an analytical operation that is performed on a data field within the data table to obtain the total count.

16. The computing device of claim 15, wherein the one or more programs further comprise instructions for:
receiving, in the first region of the graphical user interface, user specification of a first data value of a first data field in the data table; and
in response to the user specification:
filtering the data rows of the data table to a first subset of data rows whose data value for the first data field match the first data value;
displaying a first count of the first subset of data rows; and
displaying a rendering of the first subset of data rows.

17. The computing device of claim 16, wherein the one or more programs further comprise instructions for:
within the rendering of the first subset of data rows, receiving user selection of a second data value of a second data field in the data table; and
in response to the user selection:
appending, automatically and without user intervention, the second data value to the first natural language input in the first region of the graphical user interface;
further filtering the data rows of the data table from the first subset of data rows to a second subset of data rows whose data value for the second data field match the second data value; and
updating the display from the first count to a second count of the second subset of data rows.

18. The computing device of claim 15, wherein the one or more programs further comprise instructions for:
generating and displaying, in a second region of the graphical user interface, a first entity profile corresponding to the first data value, the first entity profile including identification of one or more of:
the first data field;
a parent field of the first data field;
one or more sibling values of the first data field; and
one or more child values related to the first data value.

19. A non-transitory computer-readable storage medium storing one or more programs configured for execution by one or more processors of a computing device, the one or more programs comprising instructions for:
receiving, in a first region of a graphical user interface, a first natural language input directed to a selected data source;
in response to receiving the first natural language input, parsing the first natural language input;
in accordance with the parsing, determining that the first natural language input specifies a data table from the data source indirectly by identifying a first data value specified in the first natural language input, the first data value being a data value of a first data field within the data table;
in accordance with the determining, generating and displaying in the graphical user interface:
a total count of all data rows of the data table; and
an interactive visualization of the data table, wherein the interactive visualization (1) includes a plurality of data rows and data columns of the data table and (2) is scrollable horizontally and/or vertically so as to provide more data rows and/or data columns to the graphical user interface; and
displaying, adjacent to the displayed count:
an identification of the data table; and/or
a description of an analytical operation that is performed on a data field within the data table to obtain the total count.

\* \* \* \* \*